(12) United States Patent
Caputo et al.

(10) Patent No.: US 12,361,502 B2
(45) Date of Patent: *Jul. 15, 2025

(54) SHARED VIDEO PRESENTATION WITH CONFIGURABLE INDEPENDENT COMMUNICATION CHANNELS AND DATA

(71) Applicant: MFTB Holdco, Inc., Seattle, WA (US)

(72) Inventors: Michael P. Caputo, Aurora, IL (US); Scott E. Woodard, New Buffalo, MI (US); Gregory Joseph Doerr, Palatine, IL (US)

(73) Assignee: MFTB Holdco, Inc., Seattle, WA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/099,892

(22) Filed: Jan. 20, 2023

(65) Prior Publication Data

US 2023/0153932 A1 May 18, 2023

Related U.S. Application Data

(63) Continuation of application No. 16/852,948, filed on Apr. 20, 2020, now Pat. No. 11,574,373.

(51) Int. Cl.
*G06Q 50/16* (2024.01)
*G06Q 10/10* (2023.01)
(Continued)

(52) U.S. Cl.
CPC ........... *G06Q 50/16* (2013.01); *G06Q 10/107* (2013.01); *G06Q 10/1095* (2013.01);
(Continued)

(58) Field of Classification Search
CPC .. G06Q 50/16; G06Q 10/107; G06Q 10/1095; G06Q 30/0203; G06Q 50/265; H04N 7/15
See application file for complete search history.

(56) References Cited

U.S. PATENT DOCUMENTS 5,014,049 A 5/1991 Bosley
5,245,652 A 9/1993 Larson et al.
(Continued)

FOREIGN PATENT DOCUMENTS

WO WO-2007033581 A1 * 3/2007 ....... G06F 17/30873
WO 2007100853 A1 9/2007
(Continued)

OTHER PUBLICATIONS

Shashank Khanvilkar, "Virtual Private Networks: An Overview with Performance Evaluation," 2004, IEEE Xplore, pp. 146-154. (Year: 2004).*

(Continued)

*Primary Examiner* — Tan D Nguyen
(74) *Attorney, Agent, or Firm* — VLP Law Group LLP; James A. D. White

(57) ABSTRACT

A real estate virtual showing management system manages virtual showings of listings. The system enables all parties to view the listing virtually. It does not allow a buyer to be visible to the seller side. It also does not allow a seller to be visible to the buyer side. Both the buyer and seller sides form independent confidential communication channels during the virtual showing while the agents are visible to all parties. The system further allows the listing agent to seek real-time feedback from the showing agent during the live virtual showing. In addition, the system provides confidential audio communication for the buyer side and the seller side independently. The system allows the parties to mute and unmute media from another party. The system also can auto-tag a property feature while it is being shown. The system further allows the listing agent to seek the buyer's engagement measurement data.

20 Claims, 19 Drawing Sheets

(51) Int. Cl.
  *G06Q 10/107*   (2023.01)
  *G06Q 10/1093*  (2023.01)
  *G06Q 30/02*    (2023.01)
  *G06Q 30/0203*  (2023.01)
  *G06Q 50/26*    (2024.01)
  *H04N 7/15*     (2006.01)

(52) U.S. Cl.
  CPC ....... *G06Q 30/0203* (2013.01); *G06Q 50/265* (2013.01); *H04N 7/15* (2013.01)

(56) References Cited

U.S. PATENT DOCUMENTS

| | | | |
|---|---|---|---|
| 5,280,518 | A | 1/1994 | Danler et al. |
| 5,475,375 | A | 12/1995 | Barrett et al. |
| 5,612,683 | A | 3/1997 | Trempala et al. |
| 5,705,991 | A | 1/1998 | Kniffin et al. |
| 5,974,406 | A | 10/1999 | Bisdikian et al. |
| 6,101,480 | A | 8/2000 | Conmy et al. |
| 6,157,315 | A | 12/2000 | Kokubo et al. |
| 6,300,873 | B1 | 10/2001 | Kucharczyk et al. |
| 6,385,541 | B1 | 5/2002 | Blumberg |
| 6,496,776 | B1 | 12/2002 | Blumberg et al. |
| 6,522,875 | B1 | 2/2003 | Dowling et al. |
| 6,594,633 | B1 | 7/2003 | Broerman |
| 6,624,742 | B1 | 9/2003 | Romano et al. |
| 6,636,803 | B1 | 10/2003 | Hartz, Jr. et al. |
| 6,727,801 | B1 | 4/2004 | Gervasi et al. |
| 6,842,105 | B1 | 1/2005 | Henderson et al. |
| 6,973,432 | B1 | 12/2005 | Woodard et al. |
| 7,009,489 | B2 | 3/2006 | Fisher |
| 7,058,395 | B2 | 6/2006 | Dowling et al. |
| 7,127,475 | B2 | 10/2006 | Gotz et al. |
| 7,191,058 | B2 | 3/2007 | Laird et al. |
| 7,193,503 | B2 | 3/2007 | Fisher |
| 7,292,844 | B2 | 11/2007 | Dowling et al. |
| 7,518,485 | B2 | 4/2009 | Shuster |
| 7,606,558 | B2 | 10/2009 | Despain et al. |
| 7,664,801 | B2 | 2/2010 | Walker |
| 7,728,711 | B2 | 6/2010 | Shoenfeld |
| 7,853,479 | B2 | 12/2010 | Bengson |
| 7,869,941 | B2 | 1/2011 | Coughlin et al. |
| 7,880,584 | B2 | 2/2011 | Larson et al. |
| 7,999,656 | B2 | 8/2011 | Fisher |
| 8,035,480 | B2 | 10/2011 | Woodard et al. |
| RE43,068 | E | 1/2012 | Woodard et al. |
| 8,145,352 | B2 | 3/2012 | Woodard et al. |
| 8,368,507 | B2 | 2/2013 | Conreux et al. |
| 8,385,897 | B1 | 2/2013 | Yadav-Ranjan |
| 8,451,088 | B2 | 5/2013 | Fisher |
| 8,649,486 | B1 | 2/2014 | Kellogg et al. |
| 8,754,744 | B2 | 6/2014 | Woodard et al. |
| 8,831,970 | B2 | 9/2014 | Weik et al. |
| 8,947,530 | B1 | 2/2015 | Scalisi |
| 8,971,506 | B2 | 3/2015 | Kellogg et al. |
| 9,194,157 | B2 | 11/2015 | Bahar |
| 9,208,466 | B2 | 12/2015 | Fisher |
| 9,311,656 | B2 | 4/2016 | Barnes |
| 9,460,480 | B2 | 10/2016 | Woodard et al. |
| 9,478,083 | B2 | 10/2016 | Fisher |
| 9,514,586 | B2 | 12/2016 | Rogers et al. |
| 9,536,359 | B1 | 1/2017 | Gokcebay |
| 9,659,334 | B2 | 5/2017 | Fenn |
| 9,659,424 | B2 | 5/2017 | Huber et al. |
| 9,761,071 | B2 | 9/2017 | Woodard et al. |
| 9,916,742 | B2 | 3/2018 | Kuenze |
| 9,978,192 | B1 | 5/2018 | Nicosia et al. |
| 9,990,787 | B2 | 6/2018 | Capaldi-Tallon |
| 10,026,248 | B2 | 7/2018 | Woodard et al. |
| 10,044,519 | B2 | 8/2018 | Kasmir et al. |
| 10,419,541 | B2* | 9/2019 | Harrison ............... H04L 63/029 |
| 10,713,740 | B1 | 7/2020 | Caputo |
| 10,824,996 | B1* | 11/2020 | Chu ................... G06Q 10/1095 |
| 2002/0022980 | A1 | 2/2002 | Mozayeny et al. |
| 2002/0174090 | A1 | 11/2002 | Dexter |
| 2003/0038708 | A1 | 2/2003 | Lund |
| 2003/0154573 | A1 | 8/2003 | Gould |
| 2003/0179075 | A1 | 9/2003 | Greenman |
| 2005/0149432 | A1 | 7/2005 | Galey |
| 2005/0168320 | A1 | 8/2005 | Henderson et al. |
| 2005/0192930 | A1 | 9/2005 | Hightower et al. |
| 2005/0288958 | A1 | 12/2005 | Eraker et al. |
| 2006/0106628 | A1 | 5/2006 | Faherty et al. |
| 2006/0220809 | A1 | 10/2006 | Stigall et al. |
| 2007/0100644 | A1 | 5/2007 | Keillor et al. |
| 2007/0143173 | A1 | 6/2007 | Walker et al. |
| 2007/0266081 | A1 | 11/2007 | Murchison et al. |
| 2007/0290798 | A1 | 12/2007 | Larson et al. |
| 2008/0168369 | A1 | 7/2008 | Tadman et al. |
| 2008/0169937 | A1 | 7/2008 | Lowry |
| 2010/0077320 | A1* | 3/2010 | Lepore ................ G06F 40/103 715/760 |
| 2011/0053557 | A1 | 3/2011 | Despain et al. |
| 2012/0290203 | A1 | 11/2012 | King |
| 2013/0005368 | A1 | 1/2013 | Hunziker |
| 2013/0173696 | A1* | 7/2013 | Lee ........................ H04L 67/52 709/203 |
| 2013/0260360 | A1* | 10/2013 | Baurmann ................ G06F 3/14 434/365 |
| 2013/0262186 | A1 | 10/2013 | Lazarre et al. |
| 2013/0282524 | A1 | 10/2013 | Appolito et al. |
| 2014/0233420 | A1* | 8/2014 | Honda ............... H04N 21/4425 370/252 |
| 2014/0258042 | A1 | 9/2014 | Butler et al. |
| 2014/0304178 | A1 | 10/2014 | Bengson et al. |
| 2015/0077220 | A1 | 3/2015 | Davis et al. |
| 2015/0081327 | A1 | 3/2015 | Mooker |
| 2015/0235145 | A1 | 8/2015 | Dubuc |
| 2016/0180360 | A1* | 6/2016 | Tietzen .............. G06Q 30/0203 705/7.32 |
| 2016/0180620 | A1 | 6/2016 | Eyring et al. |
| 2016/0241999 | A1 | 8/2016 | Chin et al. |
| 2016/0275762 | A1 | 9/2016 | Keunzi |
| 2016/0364928 | A1 | 12/2016 | Woodard et al. |
| 2016/0373795 | A1 | 12/2016 | Stefanoski et al. |
| 2018/0075681 | A1 | 3/2018 | Scalisi et al. |
| 2018/0232978 | A1 | 8/2018 | Schmidt-Lackner et al. |
| 2019/0123895 | A1* | 4/2019 | Blake .................... H04L 9/0637 |
| 2019/0132680 | A1* | 5/2019 | Cardona Cano .......... H04S 7/30 |
| 2019/0244455 | A1 | 8/2019 | Kim et al. |
| 2019/0327448 | A1 | 10/2019 | Fu et al. |

FOREIGN PATENT DOCUMENTS

| | | | | |
|---|---|---|---|---|
| WO | 2007143202 | A1 | 12/2007 | |
| WO | WO-2007143202 | A2 * | 12/2007 | ........... H04N 21/235 |
| WO | 2009088418 | A1 | 7/2009 | |
| WO | WO-2009088418 | A2 * | 7/2009 | ............. H04H 60/72 |
| WO | WO-2012144138 | A1 * | 10/2012 | ........... G06F 1/1616 |
| WO | WO-2014178444 | A1 * | 11/2014 | ........... G06F 3/0481 |
| WO | 2017174526 | A1 | 10/2017 | |
| WO | 2017038261 | A1 | 5/2018 | |
| WO | WO-2019006446 | A1 * | 1/2019 | ........... G06Q 20/065 |
| WO | WO-2019109533 | A1 * | 6/2019 | ......... H04L 63/0428 |

OTHER PUBLICATIONS

Peter Gusev, "Data-Centric Video For Mixed Reality," 2019, 28th International Conference on Computer Communication and Network, pp. 1-11. (Year: 2019).*

Yuki Kaeri, "Agent-Based System Architecture . . . Internet of Multimedia Things Approach," 2018, IEEE Access, pp. 17067-17079. (Year: 2018).*

Moritz Geiser, "Objective Measures of Emotion During Virtual Walks through Urban Environments", 2011, Applied Sciences, ISSN 2076-3417, pp. 1-11. (Year: 2011).*

Michael Zink, "Scalable 360 Video Stream Delivery: Challenges, Solutions, and Opportunities," 2019, IEEE Xplore, pp. 639-650. (Year: 2019).*

Aguiar et al., "Predicting Online Video Engagement Using Clickstreams,", 2015, IEEE, pp. 1-10.

(56) References Cited

OTHER PUBLICATIONS

Toma et al., "SESA: A Scalable Multi-Channel Communication and Booking Solution for e-commerce in the Tourism Domain," 2013, IEEE 10th International Conference On E-Business Engineering, 6 pages.

Geiser et al., "Objective Measures of Emotion During Virtual Walks through Urban Environments", 2011, Applied Sciences, ISSN 2076-3417, 11 pages.

* cited by examiner

FIG. 7

Appointment Details

◁ ⌂

🕐 Fri 4/3
10:05 AM – 10:35 AM

1309 N. Wellfound Ave, Unit #9012
Chicago, IL 60606
Active | Joe Smith Realty
$499,999 | 3 Beds Showing Confirmed Live Video Showing: — 908
[ Start Live Virtual Showing ]    [ Playback Virtual Showing ] — 910

Appointment Actions
[ Cancel Appointment ] — 912

Lockbox & Access Details:
Type:
Location:                                    Combination »
                                             Front Door Alarm Details:
Disarm Code            2233
Arm Code               4499
Passcode               ShowingMan
Alarm Notes:  Keypad is on right in the main hallway Notes From Listing Agent:
Watch for 2 cats Notes From Showing Agent:
Notes have not been provided.

Real-time Virtual Showing Feedback:

SHARED VIDEO PRESENTATION WITH CONFIGURABLE INDEPENDENT COMMUNICATION CHANNELS AND DATA

CROSS-REFERENCE TO RELATED APPLICATIONS

This application is a continuation of co-pending U.S. patent application Ser. No. 16/852,948, filed Apr. 20, 2020 and entitled "Multi-Party Virtual Showing System With Configurable Independent Communication Channels And Data".

FIELD OF THE DISCLOSURE

The present inversion relates generally to a real estate showing management system, and more particularly relates to a multi-party virtual showing system for showing real estate properties. More particularly still, the present disclosure relates to a multi-party real estate virtual showing management system with dynamically configurable independent communication channels and data.

DESCRIPTION OF BACKGROUND

A real estate showing scheduling system manages and processes real estate property listings (also simply referred to herein as listings) and showings of listings. A listing is a real estate property that has been put up for, for example sale or leasing, by a property owner or managing entity. In the scheduling system, a listing is a logical representation of a real estate property, and often comprises identification and contact information (such as a mobile telephone number and an E-mail address) of the owner and/or tenants and one or more listing agents of the underlying real estate property. The listing agents and owners (also referred to herein as sellers) are also collectively referred to herein as listing contacts. Listing contacts of a listing may include other interested parties, without limitation to, a co-owner, a lasting office of the listing, a tenant of the underlying real estate property, a bank, a mortgage company, an appraiser or an inspector. Additionally, a listing includes a detailed description, such as an address and features, of the underlying real estate property. The listing may further include showing instructions and other details about the property, such as school information, tax information, marketing details.

A showing of a listing is a scheduled visit of the underlying real estate property by a showing agent, such as a real estate agent for a prospect buyer. A showing appointment (also referred to herein as an appointment) is a scheduled appointment that concerns or is regarding the showing of a listing. To schedule a showing, a showing agent, for instance, accesses a scheduling system to request a showing appointment on a selected listing. The showing appointment is made on the calendar of a listing contact (such as a listing agent, which is a real estate agent for the seller). Listing agents access the scheduling system running a scheduling software application, such as ShowingTime®'s Showing-Desk™ software, to manage their calendars. For example, a listing agent marks some time slots where she/he accepts showing appointments and indicates some other time slots where she/he does not accept showing appointments. Additionally, the scheduling system allows the listing agent to indicate the procedure for the showings to be confirmed, such as no appointment required, confirmation by the seller required, etc.

After the showing appointment is requested, a request (through E-mail, telephone, text messaging, push notification, etc.) for confirmation is sent to the listing contact. When the confirmation Is received from the listing agent, the scheduling system notifies the showing agent that his/her appointment has been confirmed or accepted. The listing contact may decline the showing request. In such a case, a decline is received from the listing agent. In addition, the showing agent is notified of the decline. The time of the scheduled showing is referred to herein as showing appointment time with a beginning time and an end time, such as 1:00 PM to 1:30 PM on Apr. 3, 2020.

Usually, the showing agent accesses the property and shows the property to his client (such as a prospect buyer or an inspector, collectively referred to herein as buyer) at or around the showing appointment time. As used herein, showing the property is also referred to herein as showing the appointment. Both the showing agent and the buyer are physically present in the property. After the showing appointment time, the scheduling system oftentimes sends a request (such as a text message, an E-mail, a voice call, etc.) to the showing agent seeking feedback on the listing. In response, the showing agent sometimes sends a reply message with a showing feedback.

For various reasons, the buyer or the showing agent may not be able to physically visit the listing for showing. Instead, the buyer desires to view the inside and the outside of the property remotely while the showing agent or a different presenter physically visits the listing. For instance, the virtual showing is desired during a pandemic when social distancing is required. In such cases, the showing is conducted using, for example, a video conference software application. For example, they use the Zoom™ video conferencing software provided by Zoom Video Communications, Inc. to conduct the showing.

A Zoom™ meeting is first scheduled and later joined by the buyer, the showing agent, the listing agent, the seller and a presenter. The presenter visits the property with her/his electronic communication device's (such as a smart phone, a tablet computer, a laptop computer, etc.) camera aiming at various features of the property. The rest of the participants of the virtual showing view the features of the property on their own electronic communication devices at their own locations respectively. The presenter can be the showing agent, the listing agent, or a different individual (such as a professional videographer) under the control of the listing agent or the showing agent.

In this paradigm, there is no privacy or confidentiality between the buyer, the seller, the showing agent and the listing agent during the video conference session. There is no media (audio and/or video) or data independence between the parties either. It is thus not desirable since the buying side including the buyer and the showing agent and the selling side (including the listing agent and the seller) have a conflict of interest and prefers confidential and private communications within their respective side. The buyer intends to push down the price of the property down while the seller intends to push up the price. The buyer may express certain opinions or questions to the showing agent and do not want the same known to the selling side, and vice versa.

Accordingly, there is need for a new virtual real estate showing management system that shows properties virtually and maintains confidentiality between the buying and selling sides. The new virtual real estate showing management system provides dynamic configuration of the independent and confidential communication channel. In addition, the new virtual real estate showing management system maintains confidential showing communication data.

SUMMARY OF THE DISCLOSURE

Generally speaking, pursuant to the various embodiments, the present disclosure provides a new real estate virtual showing management system. The new real estate virtual showing management system includes a server computer software application running a server computer, a remote showing agent computer software application running on a showing agent device, a remote buyer computer software application running on a buyer device, a remote listing agent computer software application running on a listing agent device, a remote seller computer software application running on a seller device, a remote presenter computer software application, and a media routing state machine maintained by the server computer software application for controlling media relay within the real estate virtual showing management system. The media includes audio and video. The server computer includes a server processing unit, a server network interface operatively coupled to the server processing unit, and a server memory operatively coupled to the server processing unit. The server computer software application is adapted to access a database. The showing agent device includes a processing unit, an audio out interface, an audio input interface, a user input interface, a memory, a video output interface, a video input interface and a network interface. The showing agent device is adapted to communicate with the server computer over the Internet. The buyer device includes a processing unit, an audio out interface, an audio input interface, a user input interface, a memory, a video output interface, a video input interface and a network interface. The buyer device is adapted to communicate with the server computer over the Internet. The listing agent device includes a processing unit, an audio out interface, an audio input interface, a user input interface, a memory, a video output interface, a video input interface and a network interface. The listing agent device is adapted to communicate with the server computer over the Internet. The seller device includes a processing unit, an audio out interface, an audio input interface, a user input interface, a memory, a video output interface, a video input interface and a network interface. The seller device adapted to communicate with the server computer over the Internet. The presenter device includes a processing unit, an audio out interface, an audio input interface, a user input interface, a memory, a video output interface, a video input interface and a network interface. The presenter device is adapted to communicate with the server computer over the Internet. The server computer software application is adapted to receive participation requests from the showing agent device, the buyer device, the listing agent device, the seller device and the presenter device to join a virtual showing of a listing. The server computer software application is also adapted to initialize the media routing state machine, receive video of the listing from the presenter device, and relay the video from the presenter device to the buyer device, the showing agent device, the listing agent device, and the seller device. The server computer software application is further adapted to receive media from the showing agent device, and relay the media from the showing agent device to the buyer device, the listing agent device, and the seller device. In addition, the server computer software application is adapted to receive media from the listing agent device, and relay the media from the listing agent device to the buyer device, the showing agent device, and the seller device.

Moreover, the server computer software application is adapted to receive media from the buyer device, and relay the media from the buyer device to the showing agent device. The media from the buyer device is not relayed to the listing agent device or the seller device. Thereby a buyer side independent confidential communication channel is formed between the showing agent device and the buyer device. Furthermore, the server computer software application is adapted to receive media from the seller device, and relay the media from the seller device to the listing agent device, wherein the media from the seller device is not relayed to the showing agent device or the buyer device. Thereby a seller side independent confidential communication channel is formed between the listing agent device and the seller device.

In one implementation, the showing agent device and the presenter device are a single remote electronic communication device, and the remote showing agent computer software application is same as the remote presenter computer software application. In another implementation, the listing agent device and the presenter device are a single remote electronic communication device, and the remote listing agent computer software application is same as the remote presenter computer software application. In one embodiment, the remote listing agent computer software application is same as the remote showing agent computer software application, and the remote buyer computer software application is same as the remote seller computer software application.

The server computer software application is further adapted to determine a virtual showing real-time feedback pair, receive a real-time feedback request during the virtual showing from the listing agent device, forward the real-time feedback request to the showing agent device, receive a real-time feedback to the real-time feedback request from the showing agent device, forward the real-time feedback to the listing agent device, and update a showing appointment corresponding to the virtual showing with the real-time feedback. The real-time feedback request is transcribed from audio, captured by the listing agent device, by the remote listing agent computer software application or the server computer software application. The real-time feedback is transcribed from audio, captured by the showing agent device, by the remote showing agent computer software application or the server computer software application. The server computer software application is also adapted to determine a set of confidential audio communication pairs between the showing agent device, the buyer device, the listing agent device and the seller device; receive confidential communication audio from a source device; determine a target device corresponding to the source device based on the set of confidential audio communication pairs; and forward the confidential communication audio to the target device alone.

In addition, the server computer software application is adapted to receive a disengagement event from the buyer device, the disengagement event determined by the remote buyer computer software application; process the disengagement event to generate user engagement measurement data; receive a user engagement measurement data from the listing agent device, and forward the user engagement measurement data to the listing agent device. Moreover, the server computer software application is adapted to determine an auto-tag of a feature, being virtually shown, of the listing from the video of the listing from the presenter device, save the auto-tag and a corresponding timestamp; forward the video of the listing from the presenter device with the auto-tag to the showing agent device, the buyer device, the listing agent device and the seller device; and generate an auto-tag table or content using the auto-tag and the timestamp.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 7 is an illustrative screenshot of a virtual showing appointment on an electronic communication device in accordance with the teachings of this disclosure.

FIG. 9 is an illustrative screenshot of a virtual showing appointment on an electronic communication device in accordance with the teachings of this disclosure.

FIG. 12 is an illustrative screenshot of a virtual showing appointment on an electronic communication device in accordance with the teachings of this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
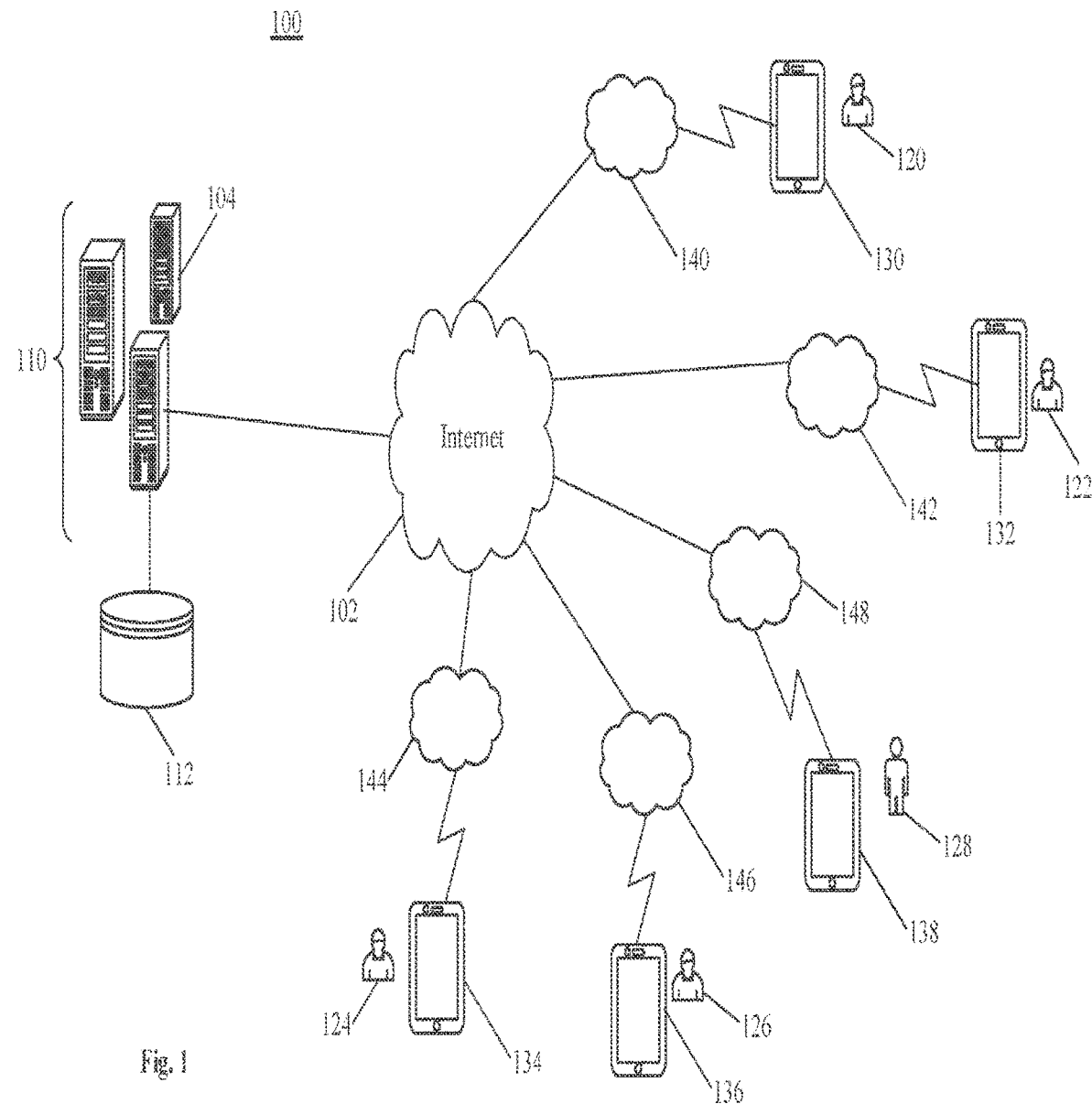
FIG. 1 is a simplified block diagram of a virtual real estate showing management system in accordance with the teachings of this disclosure.

Turning to the Figures and to FIG. 1 in particular, a real estate virtual showing management system in accordance with the present teachings is shown and generally indicated at 100. The virtual real estate showing management system 100 is adapted to perform methods in accordance with the present teachings to manage and conduct showings of real estate properties. In one illustrative embodiment, the system 100 includes a showing management system 110 which comprises one or more servers (such as a cloud server system, a server farm or a set of individual servers) indicated at 104, and one or more databases 112 for storing listing contacts, listings, showing appointments, showing media, showing data, etc. The databases 112 (such as a cloud database system, a relational database system, etc.) are operatively coupled to the servers 110 via, for example, networking links. The system 100 further includes remote electronic communication devices 130, 132, 134, 136 and 138 communicating with the server system 110 via the Internet 102. The electronic communication devices 130-138 can be smartphone, tablet computers (such as iPAD™), laptop computers or desktop computers. They access the Internet 102 through networks 140, 142, 144, 146 and 148. The networks 140-148 can be, for example, Wi-Fi networks or public cellular networks. In the illustrative embodiment, the electronic communication devices 130-138 are operated by and associated with a showing agent 120, a buyer 122, a listing agent 124, a seller 126 and a virtual showing presenter 128 respectively.

The servers 110 run a specialized server software application for scheduling showings and managing listings as set forth in U.S. Pat. Nos. 8,035,480 and 8,145,352 and U.S. patent application Ser. No. 12/757,142, which are hereby incorporated by reference. The showing appointment scheduling application is physically housed in a single server or distributed across multiple servers within the scheduling system 110. Moreover, the showing management system 110 integrates with or connects to one or more listing services (not shown) to update the database 112 of real estate property listings.

The specialized server software application includes one or more computer software programs coded using computer programming languages, such as Java C#, etc. The specialized server software application also manages virtual showings. For instance, it generates one or more URLs for a particular virtual showing. When the URLs are accessed by the devices 130-138, the specialized server software application starts a virtual showing and manages the independent and confidential communication channels for audio, video and/or data. It relays media (audio data and/or video data) and other types of data (such as feedback and instructions). It also records the virtual showing, and serves it for later playback requests from the devices 130-138. For ease of reference, data that is neither audio nor video is referred to herein as digital data.

Figure 3:
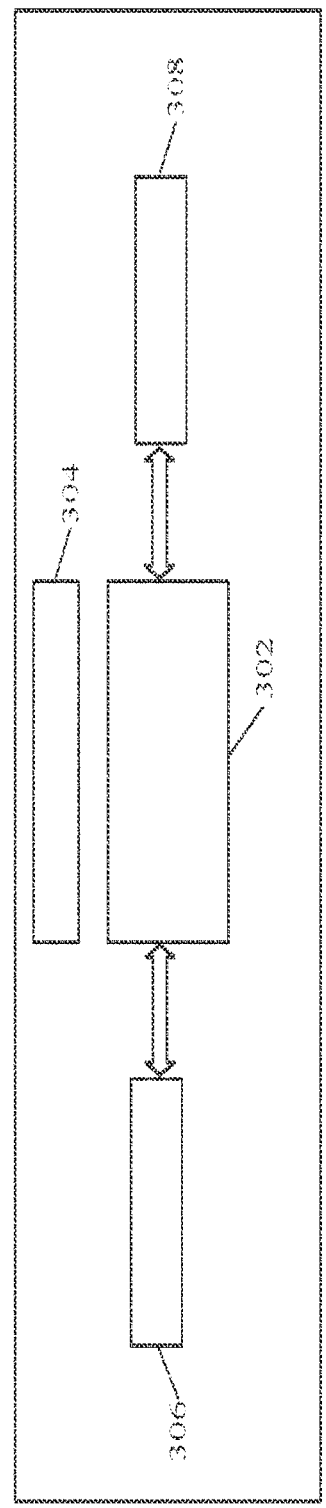
FIG. 3 is a simplified block diagram of a virtual real estate showing management system server in accordance with the teachings of this disclosure.

In accordance with the present teachings, as shown in FIG. 3, each server system 110 includes a server processing unit 302, a server network interface 306 through which the server system 110 accesses the Internet 102 and communicates with the database 112, and some amount of server memory 303. The network interface 306 and the memory 308 are operatively coupled to the processing unit 302. The server system 110 further includes a specially server computer software application 304 executed by the processing unit 302 for managing showings.

Figure 2:
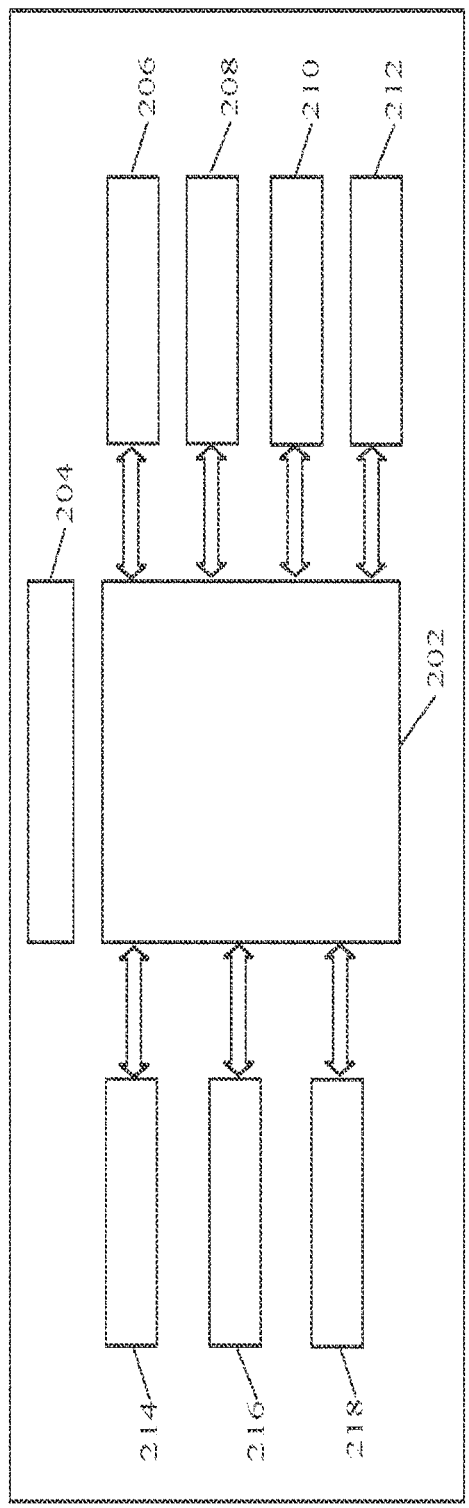
FIG. 2 is a simplified block diagram of an electronic communication device for virtual real estate showings in accordance with the teachings of this disclosure.

Each of the electronic communication devices 130-138, as shown in FIG. 2, includes a processing unit 202, an audio output interface (such as a speaker) 206, an audio input interface (such as a microphone) 206, a user input interface (such as a touch screen) 210, some amount of memory 212, a video output interface (such as a display screen) 214, a video input interface (such as a camera) 216, and a network interface 218. The elements 206-218 are operatively coupled to the processing unit 202. Each of the electronic communication devices 130-138 further includes a special remote computer software application 204 executed by the processing unit 204. The special remote computer software application 204 includes one or more computer software programs coded using computer programming languages.

The special remote computer software application 204, such as a mobile app, may provide different features to different types of users or different user interfaces for different types of users. The users include the showing agent 120, the buyer 122, the listing agent 124, the seller 126 and the showing presenter 128. The special remote computer software application 204 can be a different computer software application for different types of users as well. It can also be a world wide web based computer program loaded and executed by a web browser. It should be noted that the presenter 123 can a different individual from the showing agent 120 and the listing agent 124. In such a case, the presenter 128 is managed by either the showing agent 120 or the listing agent 124. However, both the showing agent 120 and the listing agent 124 can be the presenter 128 who physically shows a listing. In such a case, the devices 130 and 138 are the same device, or the devices 134 and 138 are the same device.

The special remote computer software application 204 running on the showing agent device 130 is also referred to herein as a remote showing agent computer software application. The special remote computer software application 204 running on the buyer device 132 is also referred to herein as a remote buyer computer software application. The special remote computer software application 204 running on the listing agent device 134 is also referred to herein as a remote listing agent computer software application. The special remote computer software application 204 running on the seller device 136 is also referred to herein as a remote seller computer software application. The special remote computer software application 204 running on the presenter device 138 is also referred to herein as a remote presenter computer software application.

The showing agent 120 operates the device 130 or a different computer (such as an office desktop computer) to access the server 110 to make a showing appointment for virtually showing a particular listing. The corresponding listing agent 124 operates the device 134 or a different computer (such as an office desktop computer) to confirm or decline the virtual showing request. The server 110 creates and stores the appointment into the database 112. When the parties participate in the virtual showing of the listing, they view the appointment and start the virtual showing.

Figure 4:
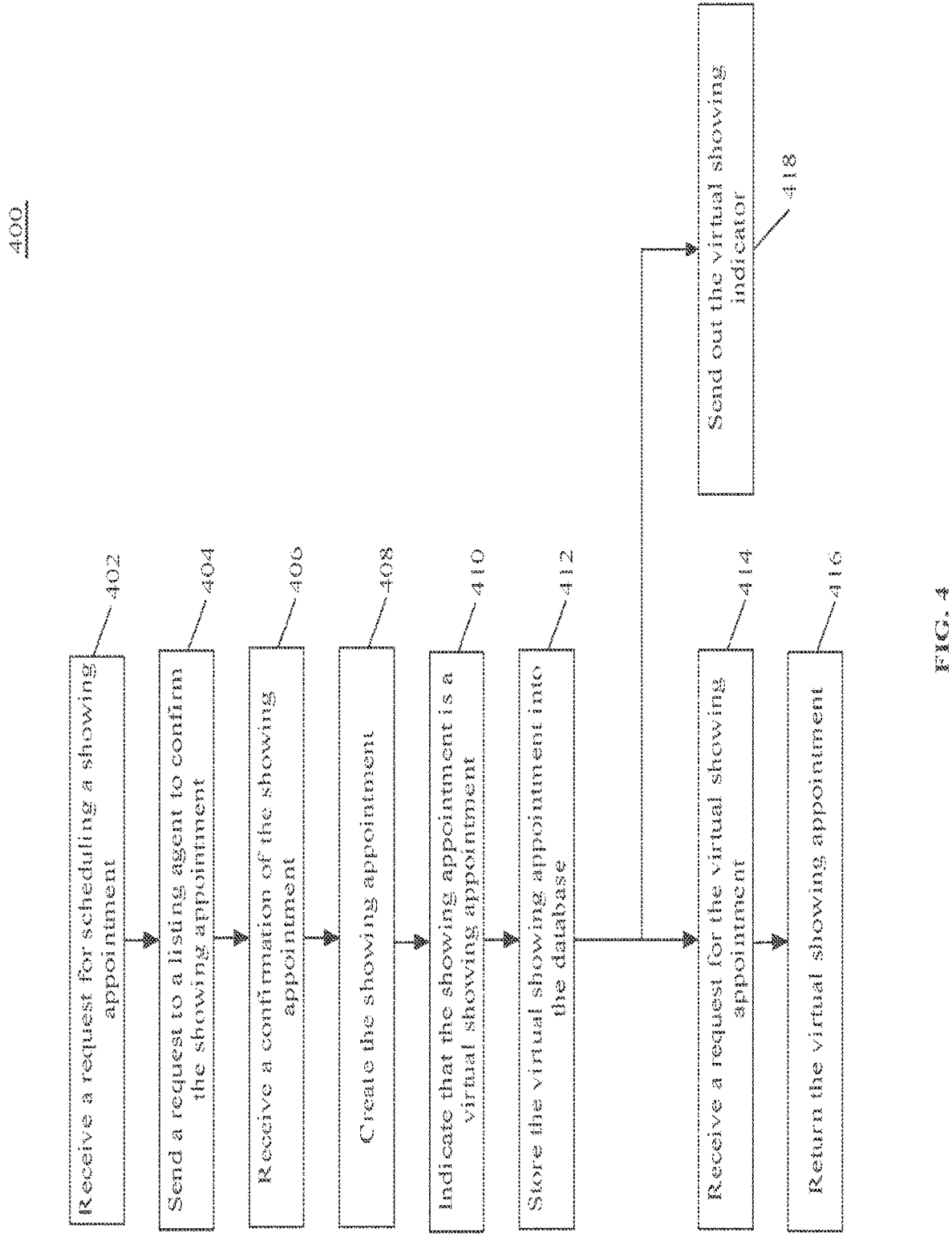
FIG. 4 is a simplified flowchart illustrating a process by which a showing management system server manages showing appointments and virtual showings in accordance with the teachings of this disclosure.

The process by which the special server computer software application 304 manages the showing appointment and the virtual showing is further illustrated by reference to FIG. 4. Referring to FIG. 4, a flowchart diagram illustrating the process is shown and generally indicated at 400. At 402, the special server application 304 receives a request for a showing appointment of a particular listing from a device operated by the showing agent 120. At 404, the special application 304 sends a confirmation request to the listing agent 124 via, for example, an E-mail message, a text message, an application message, etc. At 406, the special application 304 receives a confirmation from the listing agent 124 for showing the listing at a particular time. At 408, the special application 304 creates the virtual showing appointment. At 410, the special software application 304 configures the virtual showing appointment to indicate that it is intended for virtual showing. At 412, the special computer software application 304 stores the virtual showing appointment into the database 112.

At the time of the virtual showing, the participants 120-128 operate the devices 130-138 to access the respective special remote computer software application 204 for the virtual showing. The special remote computer software application 204 communicates with the server application 304 to retrieve the showing appointment data indicating the virtual showing. The special remote computer software application 204 then indicates the virtual showing to the corresponding user. The user can then join the virtual showing.

At 414, the special server application 304 receives the requests for the virtual showing appointment from the participates of the virtual showing. At 416, it returns the virtual showing appointment to the devices 130-138. In a different implementation, the elements 414-416 are not performed. Instead, at 418, the special server computer application 304 sends virtual showing indicators, such as Universal Resource Link (URLs), to the participates via, for example, E-mail messages, text messages, etc. They can access the indicators to join the virtual showing.

Figure 5:
FIG. 5 is an illustrative screenshot of a virtual showing appointment on an electronic communication device in accordance with the teachings of this disclosure.

FIGS. 5 through 13 further illustrate the virtual showing experienced by the participants 120-128. Turning first to FIG. 5, an illustrative screen of the special computer application 204 running on the showing agent device 130 is shown and generally indicated at 500. The interface 500 displayed on the device 130 shows the virtual showing appointment to the showing agent 120. It includes a title area 502, a showing time and a showing appointment status area 504, listing details 506, a virtual showing selector 503 corresponding to the virtual showing indicator, a virtual showing playback selector 510, an appointment action area 512 and other showing appointment data.

Figure 6:
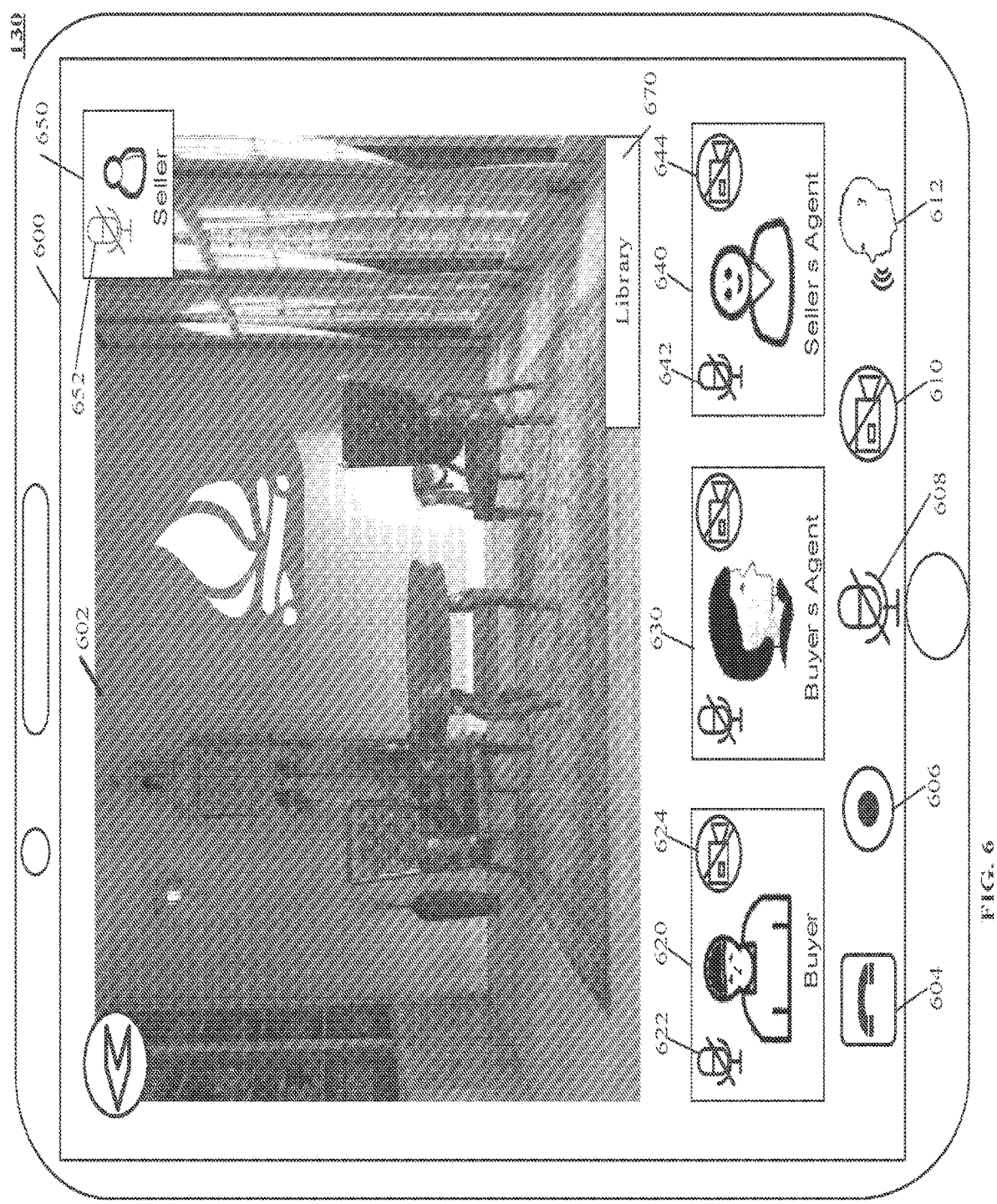
FIG. 6 is an illustrative screenshot of a virtual showing on an electronic communication device in accordance with the teachings of this disclosure.

Selecting (by clicking or touching) the virtual showing selector 508 causes the special computer application 204 to switch into the virtual showing mode, which is further illustrated by reference to FIG. 6. Referring to FIG. 6, an illustrative screen of the special computer application 204 running on the showing agent device 130 is shown and generally indicated at 600. The interface 600 displayed on the showing agent device 130 shows the virtual showing of the real estate property. The features of the interface 600 are provided by the special computer application 204.

The video of the features of the property being shown by the presenter 128 using the device 138 is indicated at 602. The camera 216 of the device 138 captures the video images of the property and sends them to the device 130 either directly or through a relay server (also referred to herein as a routing server), such as a media relay server 104. The audio of the presenter 128 is captured by the microphone 208 of the device 138, and transmitted to the showing agent device 130 either directly or through the relay server 104. The audio of the presenter 128 is then played back through the speaker 206 of the showing agent device 130. It should be noted that, when the showing agent 120 is the presenter 138, the audio of the presenter 138 is not played back on the device 130 to avoid echoing.

The seller indicator is shown at 650. Since the seller 126 has conflicting interests against the showing agent 120 and the buyer 122, the seller 126 is not shown in the seller indicator 650. In other words, the showing agent 120 cannot view the seller 126 and the identity (such as the seller's 126 face, body, setting, etc.) of the seller 126 is confidential and kept away from the buying side. The video images of the seller 126 captured by the seller device 136 are not sent to the showing agent device 130, or not displayed on the device 130. The showing agent 120 and the seller 126 cannot speak to or hear from each other either. The muted audio status icon 652 indicates the fact and is not an operable control.

The indicator of the buyer 122 is shown at 620. The video images of the buyer 122 are captured by the camera 216 of the buyer device 132 and transmitted to the showing agent device 130 either directly or through the media relay server 104. In addition, the buyer indicator 620 includes a buyer audio control 622 and a buyer video control 624. In one implementation, the controls 622-624 are clickable buttons. The showing agent 120 operates the controls 622-624 to turn on or off the audio and video of the buyer 122 respectively. The audio of the buyer 122 is captured by the microphone 208 of the device 132 and sent to the showing agent device 130 either directly or through the media relay server 104 when the audio control 622 is turned on (meaning enabled). The audio of the buyer 122 is then played back via the speaker 206 of the showing agent device 139. When the audio control 622 is disabled (meaning turned off), the audio of the buyer 122 is not sent to the showing agent device 130 or not played back on the showing agent device 130.

The video of the buyer 122 is captured by the camera 216 of the device 132 and sent to the showing agent device 130 either directly or through the media relay server 104 when the video control 624 is turned on (meaning enabled). The video images of the buyer 122 is then displayed inside the buyer indicator 620 on the display screen 214 of the showing agent device 130. When the video control 624 is disabled (meaning turned off), the video of the buyer 122 is not sent to the showing agent device 130 or not rendered on the showing agent device 130.

The indicator of the showing agent 120 is shown at 630. The video images of the showing agent 120 herself/himself are captured by the camera 216 of the showing agent device 130 and shown at 630. The Indicator 630 shows what other participates of the virtual showings see of the showing agent 120.

The listing agent 124 is indicated 640. The video images and audio of the listing agent 124 are captured by the camera 216 and the microphone 208 of the listing agent device 134 respectively, and transmitted to the showing agent device 130 either directly or through the media relay server 104. The video images of the listing agent 124 is then displayed inside the listing agent indicator 640; the audio of the listing agent 124 is played beck through the speaker 206 of the showing agent device 130.

The listing agent indicator 640 also includes a listing agent audio control 642 and a listing agent video control 644. The controls 642 allow the showing agent 120 to enable or disable the corresponding media data (audio or video) from the listing agent device 134. When the controls 642-644 are disabled the corresponding media data is not transmitted to the showing agent device 120 or not presented on the showing agent device 120. Wien the controls 642-644 are enabled, the corresponding media data is transmitted to the showing agent device 120 and presented on the showing agent device 120 at 640.

The special remote computer software application 204 further provides a termination control 604, a recording control 606, an audio mute control 608, a video mute control 610 and a confidential audio control 612. When the termination control 604 is clicked, the special computer application 204 terminates the showing agent device's 130 participation in the virtual showing. In such a case, the special remote computer software application 204 is said to exit from the virtual showing.

When the recording control 606 is turned on, the special remote computer software application 204 notifies the server 110 to start recording of the virtual showing. In response, the server 110 starts recording of the virtual showing. When it is turned off from the turned on mode, the special remote computer software application 204 notifies the server 110 to stop recording of the virtual showing. In response, the server 110 stops recording of the virtual showing and saves the recorded media.

When the audio mute control 608 is turned on, the special remote computer software application 204 does not transmit any audio of the showing agent 120 to the devices 132-138. When it is turned off, the special remote computer software application 204 transmits the audio captured by the microphone 208 of the showing agent device 130 to the devices 132-138. It should be noted that the audio of the showing agent 120 may not be transmitted or relayed to a device that has disabled the audio of the showing agent 130. Alternatively, pressing the audio mute control 608 causes the special remote computer software application 204 to bring up a selection list that allows the showing agent 120 to select which party or parties to mute or unmute the audio feed for.

When the video mute control 610 is turned on, the special remote computer software application 204 does not transmit any video images of the showing agent 120 to the devices 132-138. When it is turned off the special remote computer software application 204 transmits the video captured by the camera 216 of the showing agent device 130 to the devices 132-138. It should be noted that the video data of the showing agent 120 may not be transmitted or relayed to a device that has disabled the audio of the showing agent 120. Alternatively, pressing the video mute control 610 causes the special remote computer software application 204 to bring up a selection list that allows the showing agent 120 to select which party or parties to mute or unmute the video feed for.

When the confidential audio control 612 is turned on, a confidential audio communication channel between the showing agent 120 and the buyer 122 is established in the confidential audio mode, the audio of the showing agent 120 is only sent to the buyer device 132 either directly or through the media relay server 104. In addition, the audio is not transmitted to the listing agent device 134, the presenter device 138 or the seller device 136. When the confidential audio control 612 is turned off, the confidential audio mode is then turned off; and the audio of the showing agent 120 is no longer limited to the buyer device 132. Accordingly, the audio of the showing agent 120 is transmitted to the presenter device 138, the listing agent device 134 and the buyer device 132 either directly or through the media relay server 104. In a different implementation, the confidential audio control 612 is turned on when it is pressed down and turned off when it is released.

Figure 7:
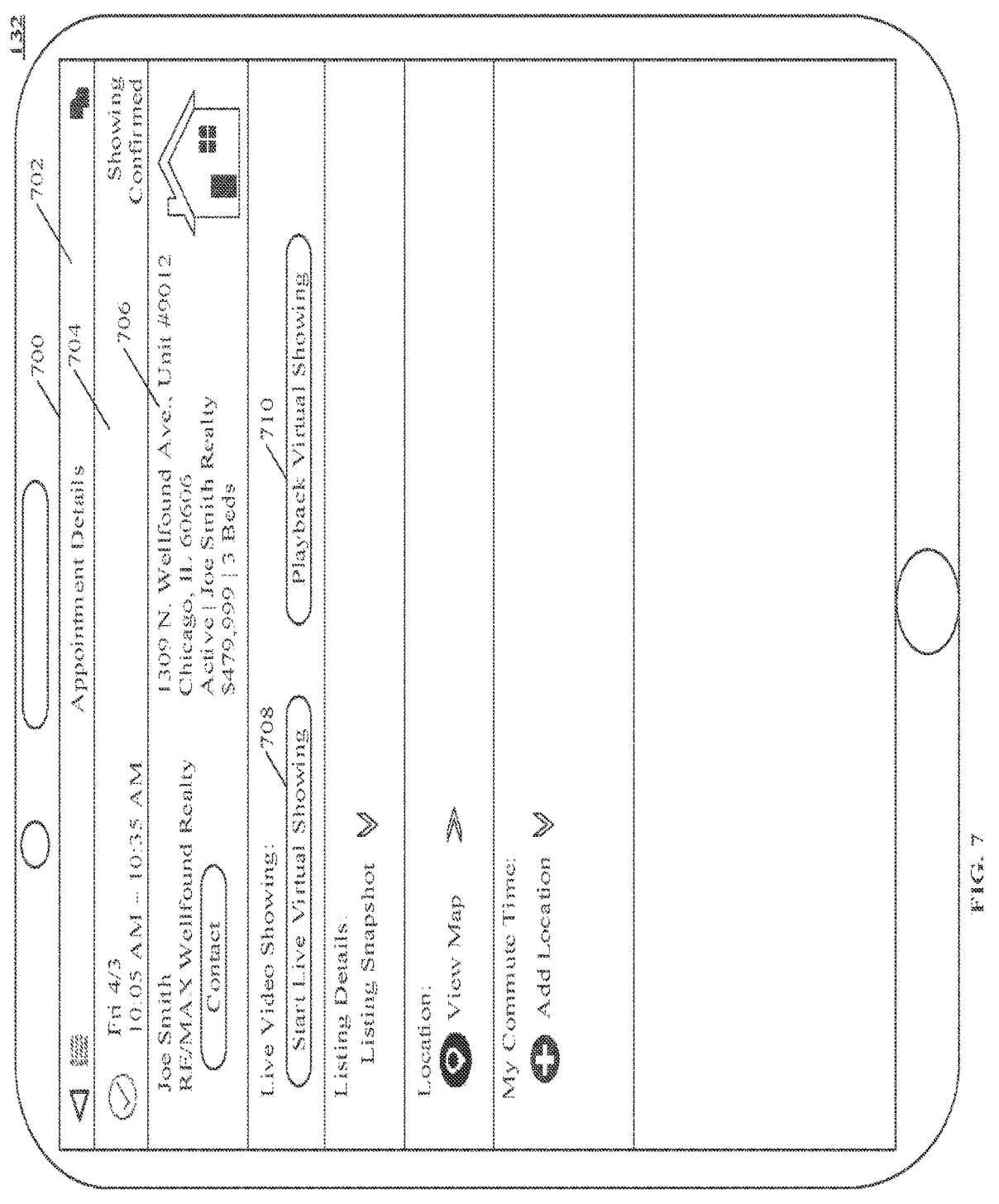

Referring to FIG. 7, an illustrative screen of the special computer application 204 running on the buyer device 132 is shown and generally indicated at 700. The interface 700 displayed on the device 132 shows the virtual showing appointment to the buyer 122. It includes a title area 702, a showing time and a showing appointment status area 704, a showing agent and property area 706, a virtual showing selector 708 corresponding to the virtual showing indicator, a virtual showing playback selector 710, and other listing and showing appointment data.

Figure 8:
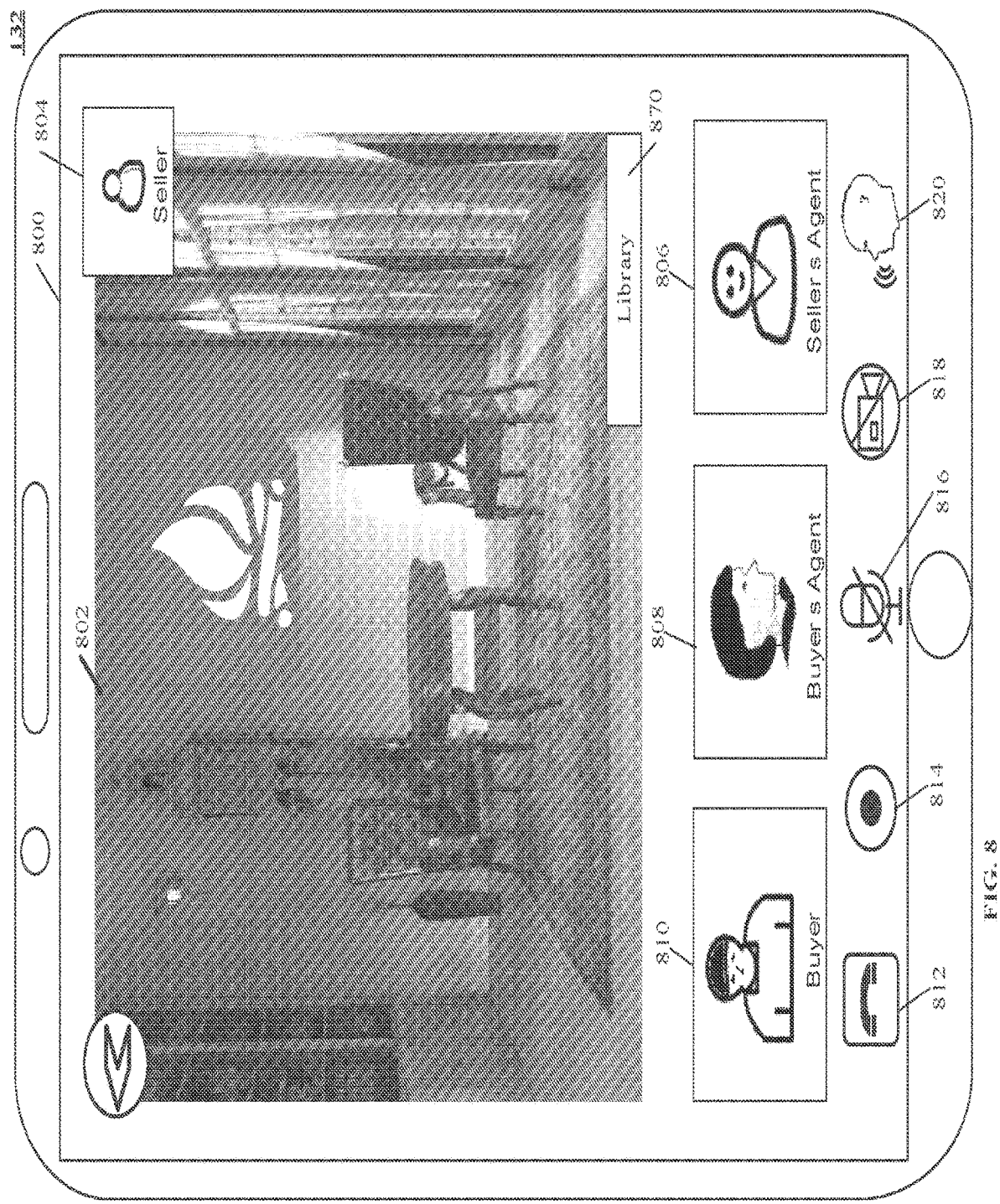
FIG. 8 is an illustrative screenshot of a virtual showing on an electronic communication device in accordance with the teachings of this disclosure.

Clicking the virtual showing selector 708 causes the special computer application 204 to switch into the virtual showing mode, which is further illustrated by reference to FIG. 8. Referring to FIG. 8, an illustrative screen of the special computer application 204 running on the buyer device 132 is shown and generally indicated at 800. The interface 800 displayed on the buyer device 132 shows the virtual showing of the real estate property. The features of the interface 800 are provided by the special computer application 204.

The video of the features of the property being shown by the presenter 128 using the device 138 is indicated at 802. The camera 216 of the device 138 captures the video images of the property and sends them to the buyer device 132 either directly or through a relay server, such as a media relay server 104. The audio of the presenter 128 is captured by the microphone 208 of the device 138, and transmitted to the buyer device 132 either directly or through the relay server 104. The audio of the presenter 128 is then played back through the speaker 206 of the buyer device 132.

The seller indicator is shown at 804. Since the seller 126 has conflicting interests against the showing agent 120 and the buyer 122, the seller 126 is not shown in the seller indicator 804. In other words, the buyer 122 cannot view the seller 126 and the identity (such as the seller's 126 face, body, setting, etc.) of the seller 126 is confidential and kept away from the buying side. The video images of the seller 126 captured by the seller device 136 are not sent to the buyer device 132, or not displayed on the device 132.

The listing agent 124 is indicated 806. The video images and audio of the listing agent 124 are captured by the camera 216 and the microphone 208 of the listing agent device 134 respectively, and transmitted to the buyer device 132 either directly or through the media relay server 104. The video images of the listing agent 124 is then displayed in the listing agent indicator 806; the audio of the listing agent 124 is played back through the speaker 206 of the buyer device 132. In one implementation, the interface 800 does not allow the buyer 122 to turn off the audio or the video image of the listing agent 124.

The showing agent 120 is indicated 808. The video images and audio of the showing agent 120 are captured by the camera 216 and the microphone 208 of the showing agent device 130 respectively, and transmitted to the buyer device 132 either directly or through the media relay server 104. The video images of the showing agent 120 is then displayed in the showing agent indicator 808; the audio of the showing agent 120 is played back through the speaker 206 of the buyer device 132. In one implementation, the interface 800 does not allow the buyer 122 to turn off the audio or the video image of the showing agent 120.

The indicator of the buyer 122 herself/himself is shown at 810. The video images of the buyer 122 herself/himself are captured by the camera 216 of the buyer device 132 and shown at 810. The indicator 810 shows what other participates of the virtual showings see of the buyer 122.

The special remote computer software application 204 further provides a termination control 812, a recording control 814, an audio mute control 816, a video mute control 818 and a confidential audio control 820. When the termination control 812 is clicked, the special computer application 204 terminates the buyer device's 132 participation in the virtual showing. In such a case, the special remote computer software application 204 is said to exit from the virtual showing.

When the recording control 814 is turned on, the special remote computer software application 204 notifies the server 110 to start recording of the virtual showing. In response, the server 110 starts recording of the virtual showing. When it is turned off from the turned on mode, the special remote computer software application 204 notifies the server 110 to stop recording of the virtual showing. In response, the server 110 stops recording of the virtual showing and saves the recorded media.

When the audio mute control 816 is turned on, the special remote computer software application 204 does not transmit any audio of the buyer 122 to the devices 132-138 or additional participates. When it is turned off, the special remote computer software application 204 transmits the audio captured by the microphone 208 of the buyer device 132 to the showing agent device 130 and other applicable devices. The audio of the buyer 122 may not be transmitted or relayed to a device that has disabled the audio of the buyer 132. Alternatively, pressing the audio mute control 816 causes the special remote computer software application 204 to bring up a selection list that allows the buyer 122 to select which party or parties to mute the audio feed for.

When the video mute control 818 is turned on, the special remote computer software application 204 does not transmit any video images of the buyer 122 to the devices 132-138. When it is turned off, the special remote computer software application 204 transmits the video captured by the camera 216 of the buyer device 132 to the showing agent device 130 and other applicable devices (such as those of additional participants from the showing agent's 120 office). The video data of the buyer 122 may not be transmitted or relayed to a device that has disabled the audio of the buyer 122. Alternatively, pressing the video mute control 813 causes the special remote computer software application 204 to bring up a selection list that allows the buyer 122 to select which party or parties to mute the video feed for.

When the confidential audio control 820 is turned on, a confidential audio exchange channel between the showing agent device 130 and the buyer device 132 is established. In the confidential audio mode, the audio of the buyer 122 is only sent to the showing agent 120 either directly or through the media relay server 104. In addition, the audio is not transmitted to the listing agent device 134, the presenter device 138 or the seller device 136. When the confidential audio control 820 is turned off, the confidential audio mode is then turned off; and the audio of the buyer 122 is no longer limited to the showing agent device 130. Accordingly, the audio of the buyer 122 is transmitted to, for example, the presenter device 138 when the presenter 128 is under control of the showing agent 120 either directly or through the media relay server 104. In a different implementation, the confidential audio control 820 is turned on when it is pressed down and turned off when it is released.

Referring now to FIG. 9, an illustrative screen of the special computer application 204 running on the listing agent device 134 is shown and generally indicated at 900. The interface 900 displayed on the device 134 shows the virtual showing appointment to the listing agent 124. It includes a title area 902, a showing time and a showing appointment status area 904, listing details 906, a virtual showing selector 908 corresponding to the virtual showing indicator, a virtual showing playback selector 910, an appointment action area 912 and other showing appointment data.

Figure 10:
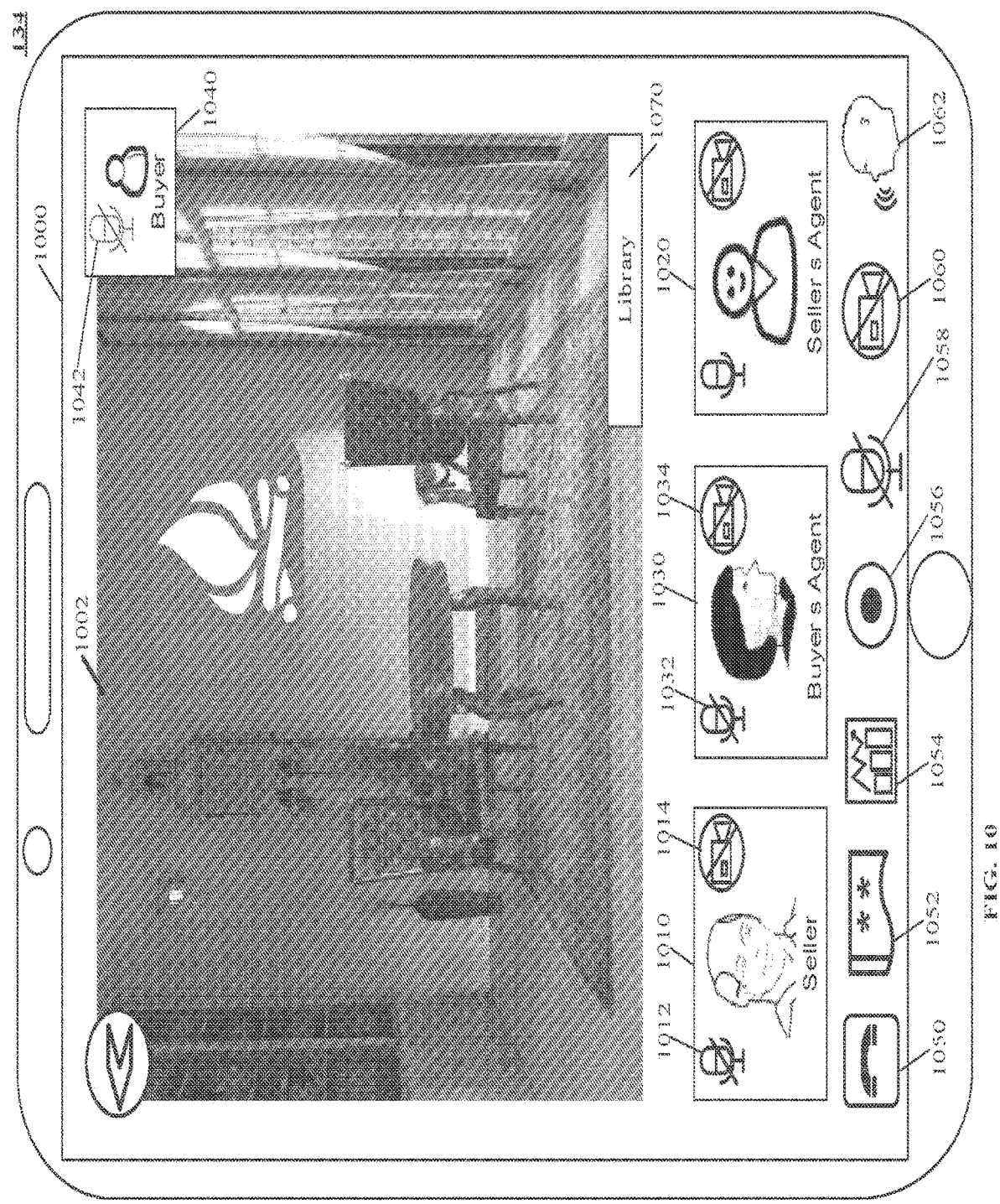
FIG. 10 is an illustrative screenshot of a virtual showing on an electronic communication device in accordance with the teachings of this disclosure.

Selecting (by clicking or touching) the virtual showing selector 908 causes the special computer application 204 to switch into the virtual showing mode, which is further illustrated by reference to FIG. 10. Referring to FIG. 10, an illustrative screen of the special computer application 204 running on the listing agent device 134 is shown and generally indicated at 1000. The interface 1000 displayed on the listing agent device 134 shows the virtual showing of the real estate property. The features of the interface 1000 are provided by the special computer application 204.

The video of the features of the property being shown by the presenter 128 using the device 138 is indicated at 1002. The camera 216 of the device 138 captures the video images of the property and sends them to the device 134 either directly or through a relay server, such as a media relay server 104. The audio of the presenter 128 is captured by the microphone 208 of the device 138, and transmitted to the listing agent device 134 either directly or through the relay server 104. The audio of the presenter 128 is then played back through the speaker 206 of the listing agent device 134. It should be noted that, when the listing agent 124 is the presenter 138, the audio of the presenter 138 is not played back on the device 134 to avoid echoing.

The seller indicator is shown at 1010, the video images of the seller 126 captured by the seller device 136 transmitted to the device 134 either directly or through the media relay server 104, and displayed at 1010. In addition, the seller indicator 1010 includes a seller audio control 1012 and a seller video control 1014. In one implementation, the controls 1012-1014 are clickable buttons. The listing agent 124 operates the controls 1012-1014 to turn on or off the audio and video of the seller 126 respectively. The audio of the seller 126 is captured by the microphone 208 of the device 136 and sent to the listing agent device 134 either directly or through the media relay server 104 when the audio control 1012 is turned on (meaning enabled). The audio of the seller 126 is then played back via the speaker 206 of the listing agent device 134. When the audio control 1012 is disabled (meaning turned off), the audio of the seller 126 is not sent to the listing agent device 134 or not played back on the listing agent device 134.

The indicator of the buyer 122 is shown at 1040. Since the seller 126 has conflicting interests against the listing agent 124 and the seller 126, the buyer 122 is not shown in the buyer indicator 1040. In one implementation, only an anonymous icon is shown. In other words, the listing agent 134 cannot view the buyer 122 and the identity (such as the buyer's 122 face, body, setting, etc.) is confidential and kept away from the selling side. The video images of the buyer 122 captured by the buyer device 132 are not sent to the listing agent device 134, or not displayed on the device 134. The listing agent 124 and the buyer 122 cannot speak to or hear from each other either. The muted audio status icon 1042 indicates the fact and is not an operable control.

The indicator of the listing agent 124 herself/himself is shown at 1020. The video images of the listing agent 124 herself/himself are captured by the camera 216 of the listing agent device 134 and shown at 1020. The indicator 1020 shows what other participates of the virtual showings see of the listing agent 124.

The showing agent 120 is indicated 1030. The video images and audio of the showing agent 120 are captured by the camera 216 and the microphone 208 of the showing agent device 130 respectively, and transmitted to the listing agent device 134 either directly or through the media relay server 104. The video images of the showing agent 120 is then displayed at the showing agent indicator 1030; the audio of the showing agent 120 is played back through the speaker 206 of the listing agent device 134.

The showing agent indicator 1030 also includes a showing agent audio control 1032 and a showing agent video control 1034. The controls 1032 allow the listing agent 134 to enable or disable the corresponding media data (audio or video) from the showing agent device 130. When the controls 1032-1034 are disabled, the corresponding media data is not transmitted to the listing agent device 134 or not presented on the listing agent device 134. When the controls 1032-1034 are enabled, the corresponding media data is transmitted to the listing agent device 134 and presented on the listing agent device 134.

The special remote computer software application 204 further provides a termination control 1050, a real-time audio feedback control 1052, an engagement control 1054, a recording control 1056, an audio mute control 1058, a video mute control 1060 and a confidential audio control 1062. When the termination control 1060 is clicked, the special computer application 204 terminates the listing agent's 1024 participation in the virtual showing. In such a case, the special remote computer software application 204 is said to exit from the virtual showing.

When the real-time audio feedback control 1052 is pressed and held, the listing agent 124 speaks out her/his request to the showing agent 120 for her/his feedback on the particular feature (such as the dining room, the kitchen, etc.) being shown and indicated at 1002. The particular property feature that is being shown and indicated at 1002 is also referred to herein as the active feature. The special remote computer software application 204 retrieves the audio data, representing the listing agent's 124 real-time feedback request and captured by the microphone 203 of the listing agent device 134. The audio is not transmitted to other devices 130, 136-138 or not played back on the same. The special remote computer software application 204 transcribes the audio into text and displays it on the display screen 214 of the listing agent device 134. The text is a real-time feedback request. It is sent to the showing agent device 132 either directly or through the server 110. Alternatively, the audio data (i.e., the real-time feedback request in audio format) is sent to the showing agent device 132 either directly or through the server 110. The server 110 may transcribe the audio into text and forwards the text to the showing agent device 132.

When the special remote computer software application 204 running on the showing agent device 130 receives the real-time feedback request, it is presented to the showing agent 120. If it is in text format, it is displayed on the display screen 214 of the showing agent device 130. If it is in audio format, it is played back via the speaker 205 of the showing agent device 130. In response, the showing agent 120 orally provides a response. The special remote computer software application 204 running on the showing agent device 130 captures the audio of the real-time feedback response. It does not send the response to anyone except the listing agent device 134. In one implementation, special remote computer software application 204 transcribes the response into text and sends it to the listing agent device 134 either directly or via the server 110, which then displays the response on the device 134. Alternatively, the audio response is sent out, and transcribed by the server 110 or the listing agent device 134. Even when the communication is conducted directly between the device 130 and the device 134, the real-time feedback request and response are also sent to the server 110.

The server 110 modifies the listing by adding the real-time feedback request and response (referred to herein as a virtual showing real-time feedback) into the listing stored in the database 112. In other words, the listing is updated with the virtual showing real-time feedback in the database 112. As used herein, the server 110 is said to have received the real-time feedback request originated from the listing agent device 134 and the real-time feedback response originated from the showing agent device 130. The real-time feedback response is also referred to herein as the real-time virtual showing feedback.

When the real-time audio feedback control 1052 is released, the special remote computer software application 204 then ends the real-time audio feedback mode. Alternatively, the special remote computer software application 204 enters the real-time audio feedback mode when the real-time audio feedback control 1052 is pressed and released; and exits the real time audio feedback mode when the real-time audio feedback control 1052 is pressed and released again. In such a case, the real-time audio feedback control 1052 is a toggle button. When the engagement, control 1054 is clicked, the special remote computer software application 204 requests the server 110 to provide the buyer's 122 engagement data, and displays the same on the display screen 214 of the listing agent device 134.

When the recording control 1056 is turned on, the special remote computer software application 204 notifies the server 110 to start recording of the virtual showing. In response, the server 110 starts recording of the virtual showing. When it is turned off from the turned on mode, the special remote computer software application 204 notifies the server 110 to stop recording of the virtual showing. In response, the server 110 stops recording of the virtual showing and saves the recorded media.

When the audio mute control 1058 is turned on, the special remote computer software application 204 does not transmit any audio of the listing agent 124 to the devices 130-138. When it is turned off, the special remote computer software application 204 transmits the audio captured by the microphone 208 of the listing agent device 134 to the devices 130, 134, and 138. The audio of the listing agent 124 may not be transmitted or relayed to a device that has disabled the audio of the listing agent 134. Alternatively, pressing the audio mute control 1058 causes the special remote computer software application 204 to bring up a selection list that allows the listing agent 124 to select which party or parties to mute or unmute the audio feed for.

When the video mute control 1060 is turned on, the special remote computer software application 204 does not transmit any video images of the listing agent 134 to the devices 132-138. When it is turned off, the special remote computer software application 204 transmits the video captured by the camera 216 of the listing agent device 134 to the devices 132-138. The video data of the listing agent 124 may not be transmitted or relayed to a device that has disabled the audio of the listing agent 124. Alternatively, pressing the video mute control 1060 causes the special remote computer software application 204 to bring up a selection list that allows the listing agent 124 to select which party or parties to mute or unmute the video feed for.

When the confidential audio control 1062 is turned on, a confidential audio communication channel between the listing agent 124 and the seller 126 is established. In the confidential audio mode, the audio of the listing agent 124 is only sent to the seller device 136 either directly or through the media relay server 104. In addition, the audio is not transmitted to the showing agent device 130, the presenter device 138 or the buyer device 132. When the confidential audio control 1062 is turned off, the confidential audio mode is then turned off; and the audio of the listing agent 124 is no longer limited to the seller device 132. Accordingly, the audio of the listing agent 124 is transmitted to the presenter device 138, the showing agent device 130 and the seller device 138 either directly or through the media relay server 104.

Figure 11:
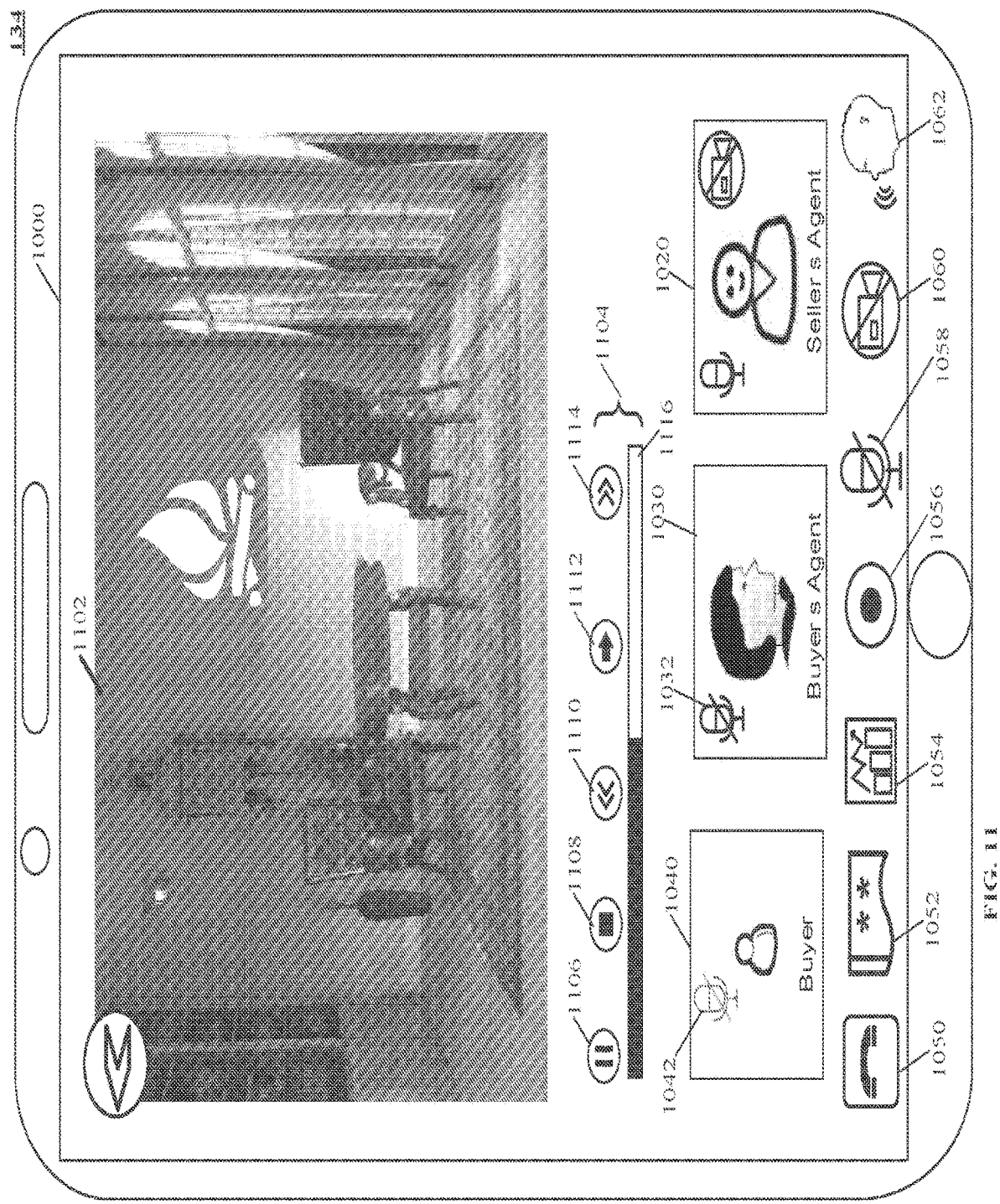
FIG. 11 is an illustrative screenshot of a recorded virtual showing on an electronic communication device in accordance with the teachings of this disclosure.

Selecting (by clicking or touching) the virtual showing playback selector 910 causes the special computer application 204 to switch into the virtual showing playback mode, which is further illustrated by reference to FIG. 11. Referring to FIG. 11, an illustrative screen of the special computer application 204 running on the listing agent device 134 is shown and generally indicated at 1100. The interface 1100 displayed on the listing agent device 134 shows the virtual showing of the real estate property that is previously recorded. The features of the interface 1100 are provided by the special computer application 204.

The video of recording is shown at 1102. A playback control panel is shown at 1104. The playback control panel 1104 includes a playback pause control 1106, a playback stop control 1108, a playback backward control 1110, a playback play control 1112, a playback forward control 1114, and a playback progress bar 1016.

Figure 12:
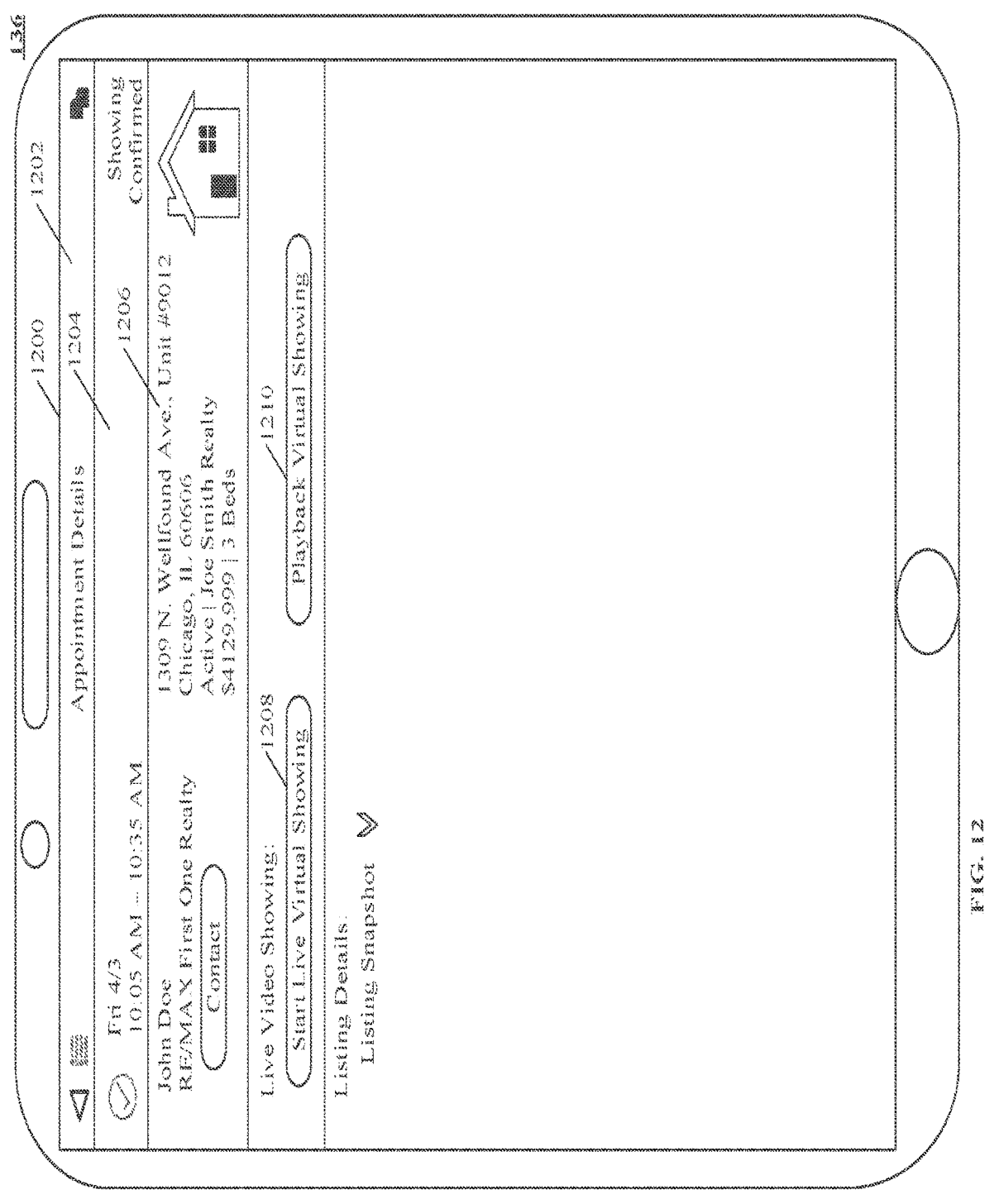

Referring to FIG. 12, an illustrative screen of the special computer application 204 running on the seller device 136 is shown and generally indicated at 1200. The interface 1200 displayed on the device 136 shows the virtual showing appointment to the seller 126. It includes a title area 1202, a showing time and a showing appointment status area 1204, a listing agent and property area 1206, a virtual showing selector 1208 corresponding to the virtual showing indicator, a virtual showing playback selector 1210, and other listing and showing appointment data.

Figure 13:
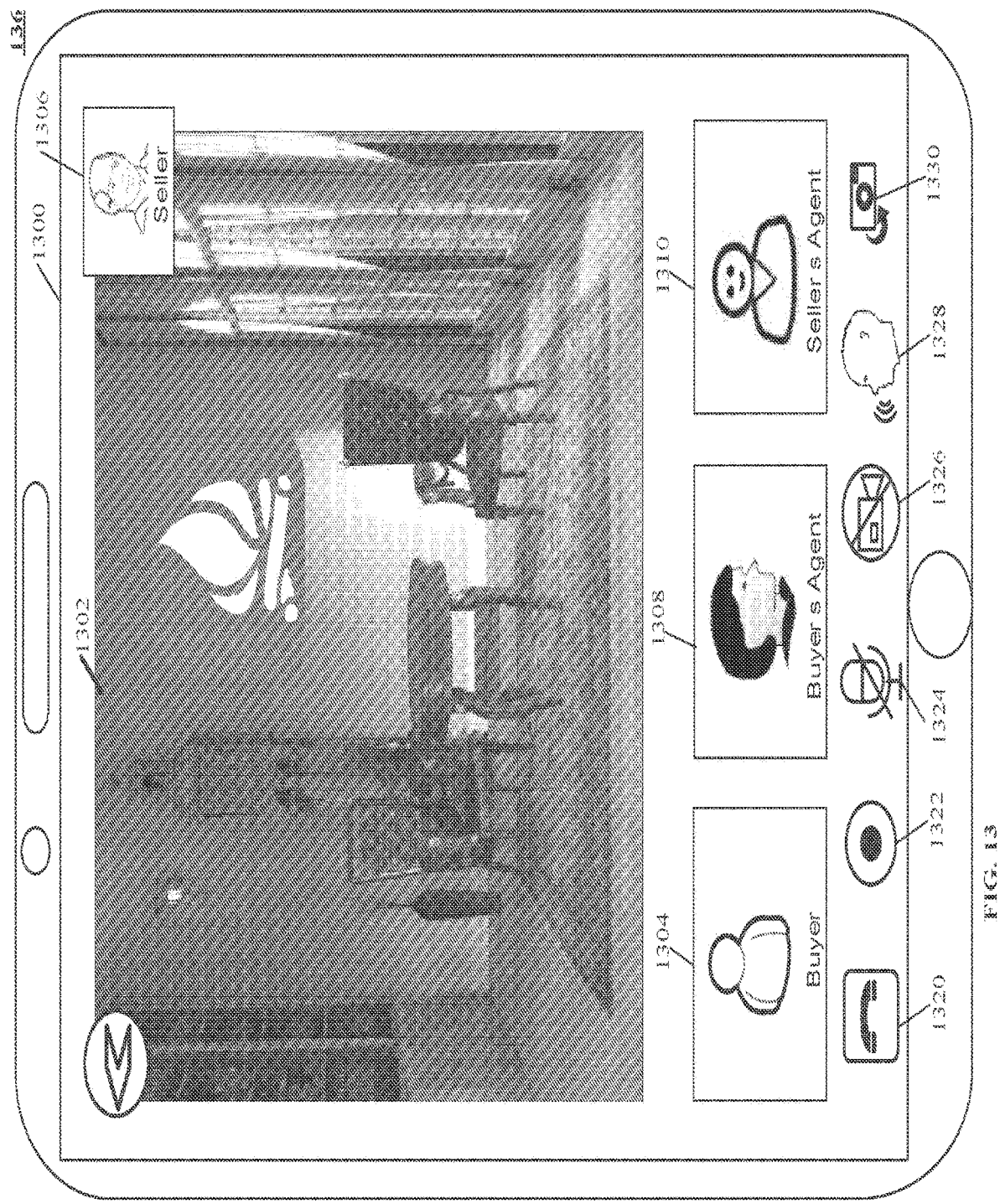
FIG. 13 is an illustrative screenshot of a virtual showing on an electronic communication device in accordance with the teachings of this disclosure.

Clicking the virtual showing selector 1208 causes the special computer application 204 to switch into the virtual showing mode, which is further illustrated by reference to FIG. 13. Referring to FIG. 13, an illustrative screen of the special computer application 204 running on the seller device 136 is shown and generally indicated at 1300. The interface 1300 displayed on the seller device 136 shows the virtual showing of the real estate property. The features of the interface 1300 are provided by the special computer application 204.

The video of the features of the property being shown by the presenter 128 using the device 138 is indicated at 1302. The camera 216 of the device 138 captures the video images of the property and sends them to the seller device 136 either directly or through a relay server such as a media relay server 104. The audio of the presenter 128 is captured by the microphone 208 of the device 138, and transmitted to the seller device 136 either directly or through the relay server 104. The audio of the presenter 128 is then played back through the speaker 206 of the seller device 136.

The buyer indicator is shown at 1304. Since the seller 126 has conflicting interests against the listing agent 124 and the buyer 122, the buyer 122 is not shown in the buyer indicator 1304. Only an anonymous icon is shown. In other words, the seller 126 cannot view the buyer 122 and the identity (such as the buyer's 122 face, body, setting, etc.) of the buyer 122 is confidential and kept away from the selling side. The video images of the buyer 122 captured by the buyer device 132 are not sent to the seller device 136, or not displayed on the device 136.

The indicator of the seller 129 is shown at 1306. The video images of the seller 126 herself/himself are captured by the camera 216 of the seller device 136 and shown at 1306. The indicator 1306 shows what other participates of the virtual showings see of the seller 126.

The showing agent 120 is indicated 1308. The video images and audio of the showing agent 120 are captured by the camera 216 and the microphone 208 of the showing agent device 130 respectively, and transmitted to the seller device 136 either directly or through the media relay server 104. The video images of the showing agent 120 is then displayed at the showing agent indicator 1308; the audio of the showing agent 120 is played back through the speaker 206 of the seller device 136. In one implementation, the interface 1300 does not allow the seller 126 to turn off the audio or the video image of the showing agent 120.

The listing agent 124 is indicated 1310. The video images and audio of the listing agent 124 are captured by the camera 216 and the microphone 208 of the listing agent device 134 respectively, and transmitted to the seller device 136 either directly or through the media relay server 104. The video images of the listing agent 124 is then displayed at the listing agent indicator 1310; the audio of the listing agent 124 is played back through the speaker 206 of the seller device 136. In one implementation, the interface 300 does not allow the seller 126 to turn off the audio or the video image of the listing agent 124.

The special remote computer software application 204 further provides a termination control 1320, a recording control 1322, an audio mute control 1324, a video mute control 1326, a confidential audio control 1328, and a camera switch control 1330. Wen the termination control 1320 is clicked, the special computer application 204 terminates the seller device's 136 participation in the virtual showing. In such a case, the special remote computer software application 204 is said to exit from the virtual showing.

When the recording control 1322 is turned on, the special remote computer software application 204 notifies the server 110 to start recording of the virtual showing. In response, the server 110 starts recording of the virtual showing. When it is turned off from the turned on mode, the special remote computer software application 204 notifies the server 110 to stop recording of the virtual showing. In response, the server 110 stops recording of the virtual showing and saves the recorded media.

When the audio mute control 1324 is turned on, the special remote computer software application 204 does not transmit any audio of the seller 126 to the devices 130-138 or additional participates. When it is turned off, the special remote computer software application 204 transmits the audio captured by the microphone 208 of the seller device 136 to the listing agent device 134 and other applicable devices (such as the presenter device 138 when the presenter 128 is under the control of the listing agent 124). The audio of the buyer 122 may not be transmitted or relayed to a device that has disabled the audio of the seller 126. Alternatively, pressing the audio mute control 1324 causes the special remote computer software application 204 to bring up a selection list that allows the seller 126 to select which party or parties to mute or unmute the audio feed for.

When the video mute control 1326 is turned on, the special remote computer software application 204 does not transmit any video images of the seller 126 to other devices. When it is turned off, the special remote computer software application 204 transmits the video captured by the camera 216 of the seller device 136 to the listing agent device 134 and other applicable devices (such as those of additional participants from the showing agent's 120 office, or the presenter device 138 when the presenter 128 is under the control of the listing agent 124). The video data of the seller 126 may not be transmitted or relayed to a device that has disabled the audio of the seller 126. Alternatively, pressing the video mute control 1326 causes the special remote computer software application 204 to bring up a selection list that allows the seller 126 to select which party or parties to mute or unmute the video feed for.

When the confidential audio control 1328 is turned on, a confidential audio channel between the listing agent 124 and the seller 126 is established. In the confidential audio mode, the audio of the seller 126 is only sent to the listing agent 124 either directly or through the media relay server 104. In addition, the audio is not transmitted to the showing agent device 130, the presenter device 138 or the buyer device 132. When the confidential audio control 1328 is turned off, the confidential audio mode is then turned off; and the audio of the seller 126 is no longer limited to the listing agent device 134. Accordingly, the audio of the seller 126 is transmitted to, for example, the presenter device 138 when the presenter 128 is under control of the listing agent 124 either directly or through the media relay server 104. In a different implementation, the confidential audio control 1328 is turned on when it is pressed down and turned off when it is released. The camera switch control 1330 allows the seller to switch between the front camera and the rear camera of the seller device 136.

In one implementation, when any of the audio mute controls 608, 816, 1058 and 1324 is operated to mute the audio, the corresponding electronic communication device (130, 132, 134 or 136) does not send the audio of the corresponding user to other participating electronic communication devices or the server system 110 in the virtual showing. Similarly, when any of the video mute controls 610, 818, 1060 and 1326 is operated to mute the video feed from the corresponding electronic communication device, the device does not send the video it captured to other participating electronic communication devices or the server system 110 in the virtual showing. When these media controls are operated to unmute the corresponding media, the media is then captured and sent to other participating devices in the virtual showing.

Figure 14:
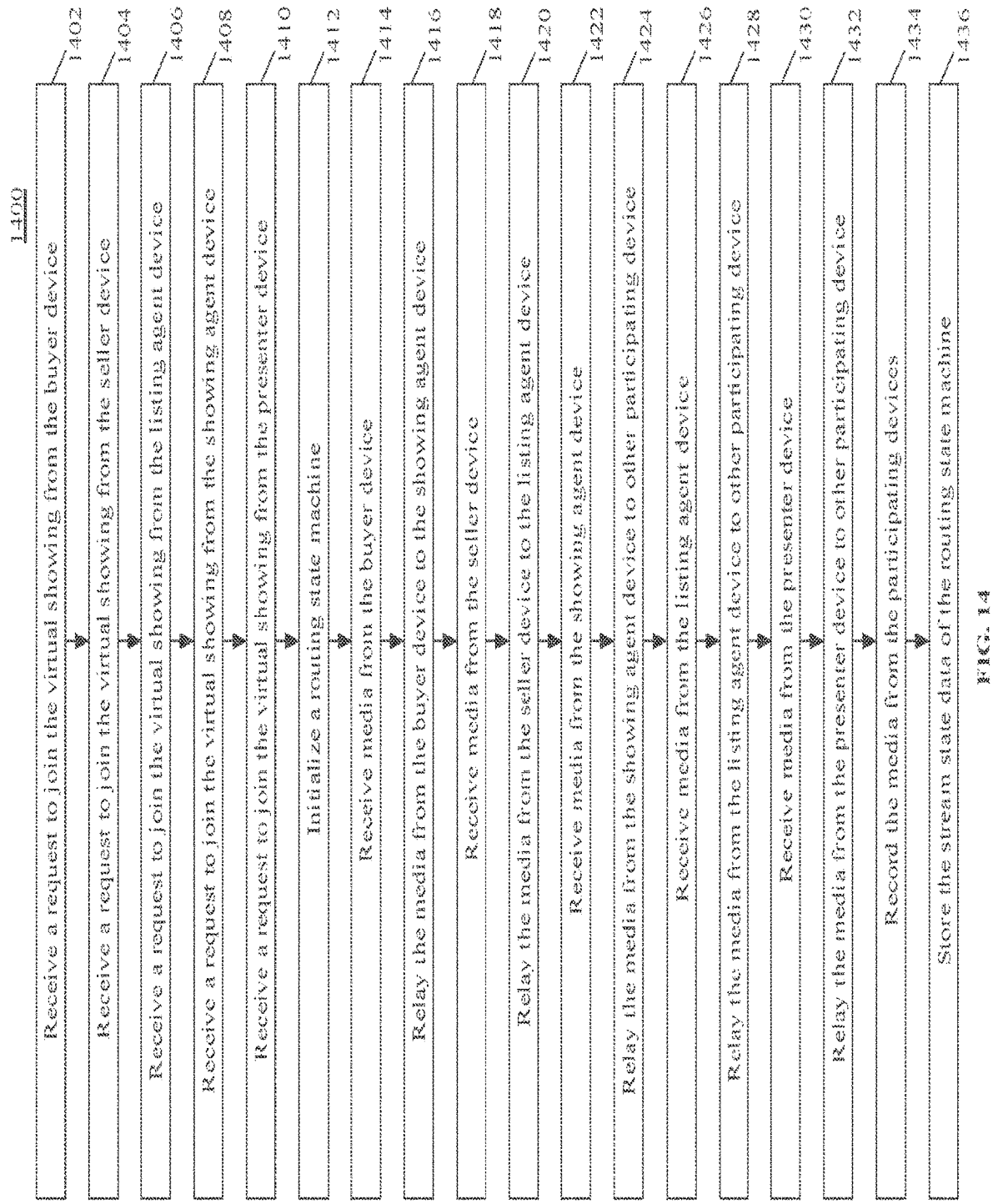
FIG. 14 is a flowchart illustrating a process by which a showing management system manages a virtual showing in accordance with the teachings of this disclosure.

The participants of the virtual showing operate the controls 508, 708, 908, 1208, or URL links to communicate with the server 110 and join the virtual showing. The process of the virtual showing is further illustrated by reference to FIG. 14. Turning to FIG. 14, a flowchart depicting a process by which the specialized sever software application 304 and the specialized remote computer software application 204 manage the virtual showing is shown and generally indicated at 1400. At 1402, 1404, 1406, 1408 and 1410, the specialized sever software application 304 receives the requests to join the virtual showing from the buyer device 132, the seller device 136 the listing agent device 134, the showing agent device 130 and the presenter device 138 respectively.

Figure 15A:
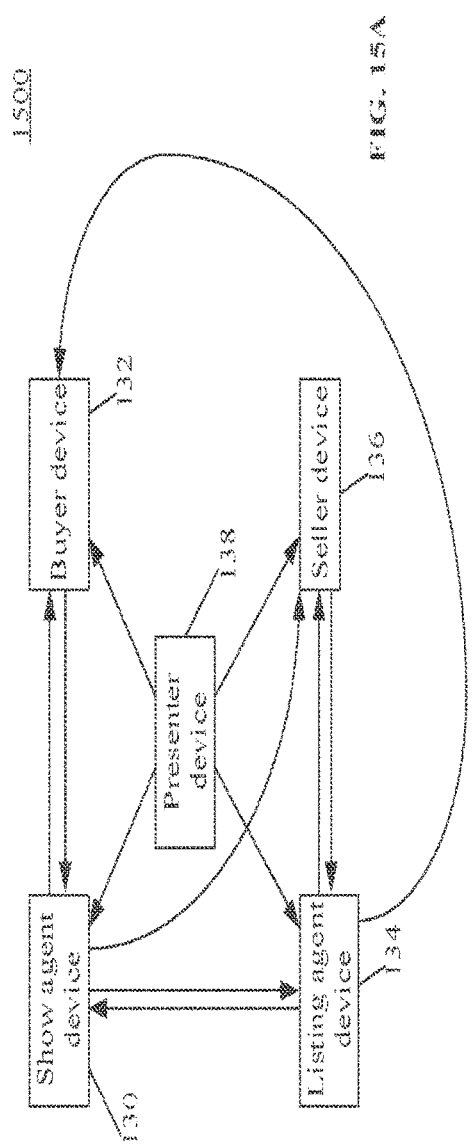
FIG. 15A is a block diagram illustrating a media routing state machine for a virtual showing in accordance with the teachings of this disclosure.
Figure 15B:
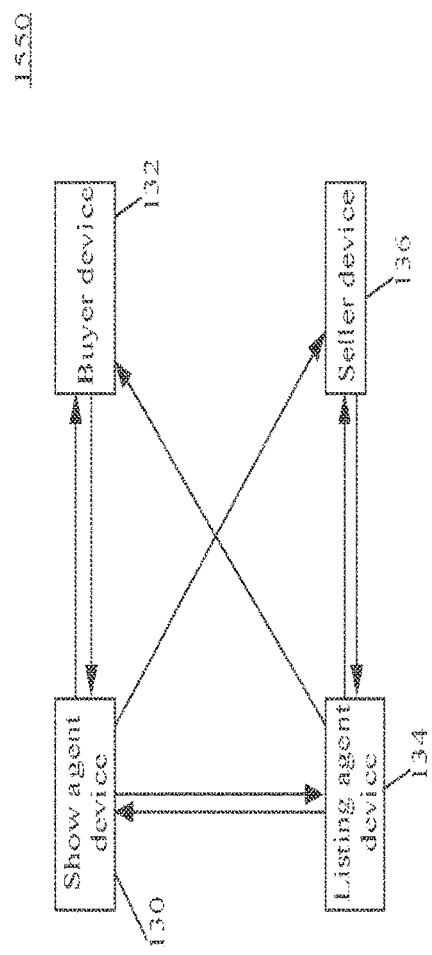
FIG. 15B is a block diagram illustrating a media routing state machine for a virtual showing in accordance with the teachings of this disclosure.

At 1412, the specialized sever software application 304 initializes an audio and video routing state machine. The initialized media routing state machine reflects which device has joined the virtual showing. In one implementation, the media routing state machine is a data structure maintaining the present states of communication between the devices 130-138. It is further illustrated by reference to FIGS. 15A and 15B. Turning first to FIG. 15A, a block diagram illustrating the routing state machine is shown and generally indicated at 1500. The presenter device 138, being a different device from the devices 130 and 134 in the illustrative embodiment, provides video and audio of the actual showing physically at the property that it captures to all the devices 130-136 through the server 110. The buyer device 132 sends its media (audio and video) only to the device 130. It receives media from both the device 130 and the device 134. It does not communicate with the seller device 136. It does not send its media to the device 134 either.

The seller device 136 sends its media (audio and video) only to the device 134. It receives media from both the device 130 and the device 134. It does not communicate with the buyer device 132. It does not send its media to the device 132 either. The device 130 sends its media to the devices 132-136; receives media from the devices 132-134; and does not receive media from the device 136. The device 134 sends its media to the devices 130-132 and 136; receives media from the devices 130 and 136; and does not receive media from the device 132. The device 130-132 engage in confidential communication on the buyer side; while the device 134-136 engage in confidential communication on the seller side. The two confidential communication channels are separate and independent from each other. The confidentiality is also preserved when either the device 130 or the device 134 functions as the presenter device 138. Such a paradigm is shown and generally indicated at 1550 in FIG. 15B

The communications between the devices 130 and 134 and between the device 138 and the devices 130-138 are not confidential. They are also referred to herein as public communication channels during the virtual showing of the listing. The communication from the device 130 to the device 136 is also not confidential. Similarly, the communication from the device 134 to the device 132 is not confidential. Both public and independent confidential communication channels coexist during the virtual showing.

The routing state machine, maintained by the special remote computer software application 304, also indicates whether a particular device (such as 130, 132, 134, 126 or 138) is participating the virtual showing or has exited the virtual showing. When a device joins the virtual shewing, it is indicated as actively participating the virtual showing.

When any of the devices 130-138 captures audio and video, the media is sent to the server 104. At 1414, 1418, 1422, 1426 and 1430, the specialized sever software application 304 receives the media data from the sending devices 132, 136, 130, 134 and 138 respectively. At 1416, 1420, 1424, 1428 and 1432, the specialized sever software application 304 relays the received media to other devices based on the routing state machine and the limitations of the two confidential communication channels on the buyer and seller sides respectively. For example, media from the device 134 is not forwarded to the device 132. As an additional example, audio and/or video from the device 134 is not forwarded to the device 130 if the showing agent 120 has muted audio and/or video from the device 134 respectively.

At 1434, the specialized sever software application 304 records the media from the devices 130-138. For example, audio from separate devices is stored as separate audio streams and video from separate devices is stored as separate video streams. At 1436, the specialized sever software application 304 also stores the stream state data of the routing state machine into the database 112 or a file.

The routing state machine may change. For example, when the showing agent 120 operates the control 642 to mute or unmute audio of the listing agent 124, the routing state machine is changed such that the specialized sever software application 304 stops or resumes relaying audio from the device 134 to the device 130 respectively. The timestamp of the change is also recorded in the routing state machine. The event of the change is also termed herein as a toggle. Similarly, when the showing agent 120 operates the control 644 to mute or unmute video of the listing agent 124, the routing state machine is changed such that the specialized sever software application 304 stops or resumes relaying video from the device 134 to the device 130 respectively. When the recorded virtual showing is played back triggered by operation on the controls 510, 710, 910 or 1210, the saved routing state machine data is also applied to the playback.

Figure 16:
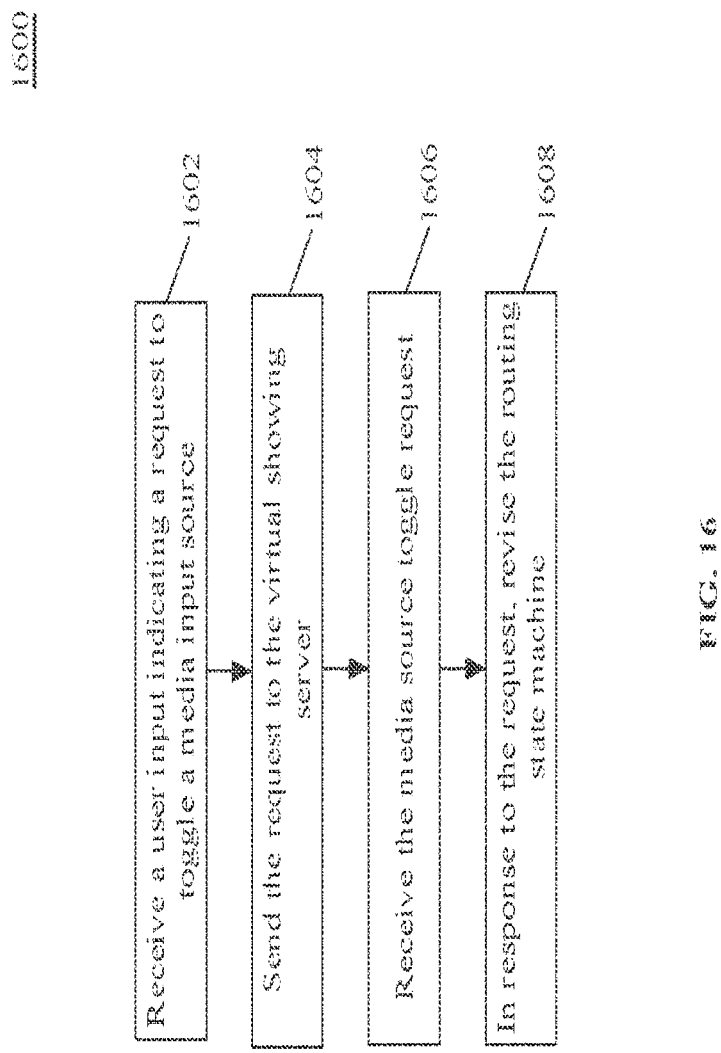
FIG. 16 is a flowchart illustrating a process by which a showing management system manages media of a virtual showing in accordance with the teachings of this disclosure.

The toggling of audio and video input is further illustrated by reference to FIG. 16. Referring to FIG. 16, a flowchart illustrating a process by which the specialized sever software application 304 and the specialized remote computer software application 204 manage media of a virtual showing is shown and generally indicated at 1600. At 1602, the specialized remote computer software application 204 running on any of the devices 130-136 receives a user input indicating a request to toggle a media input source. For instance, the listing agent 124 operates the controls 1032-1034 to mute or unmute the audio and video of the showing agent 120 respectively. At 1604, the specialized remote computer software application 204 sends the request to the specialized sever software application 304. At 1606, the specialized sever software application 304 receives it. At 1608, the specialized sever software application 304 updates the routing state machine. In one implementation, the routing state machine is saved whenever it's changed. Alternatively, it's periodically saved.

Figure 17:
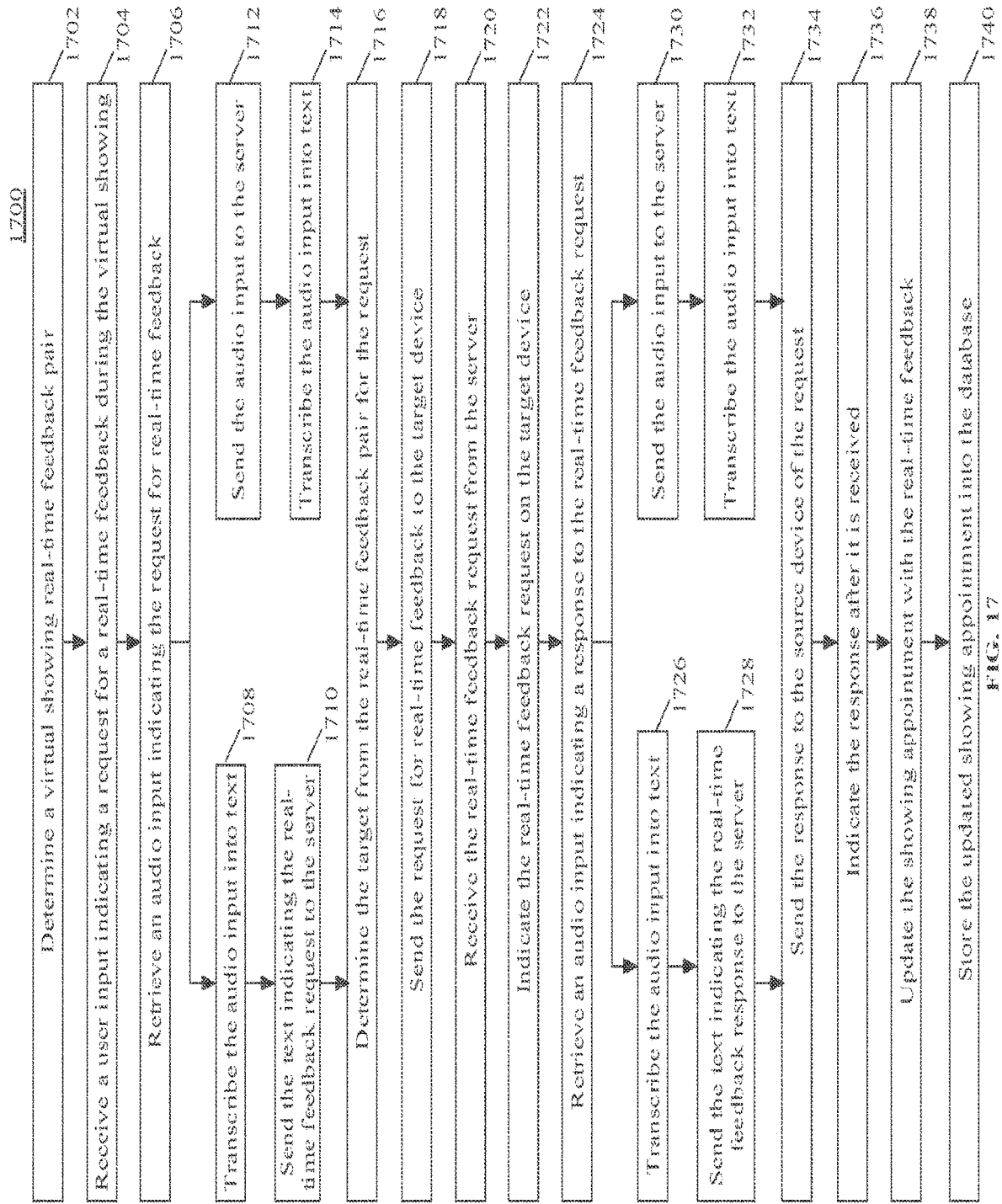
FIG. 17 is a flowchart illustrating a process by which a showing management system manages real-time feedback of a virtual showing in accordance with the teachings of this disclosure

The virtual showing management system also allows the listing agent 124 to request a real-time feedback from the showing agent on the property or the particular feature being shown during the virtual showing. The feature can be a dining room, a living room, a family room, a kitchen, a bed room, a bathroom, a basement, a library, etc. The virtual showing real-time feedback management is further illustrated by reference to FIG. 17. Turning to FIG. 17, a flowchart illustrating a process by which the specialized sever software application 304 and the specialized remote computer software application 204 manage the virtual showing real-time feedback is shown and generally indicated at 1700. At 1702, the specialized sever software application 304 determines a virtual showing real-time feedback pair between the participants of the virtual showing. In one implementation, the pair includes the listing agent device 134 as the source device and showing agent device 130 as the target device. They are also referred to herein as the real-time feedback source device and the real-time feedback target device.

At 1704, the specialized remote computer software application 204 running on the listing agent device 134 receives a user input indicating a request for a real-time feedback from the showing agent 120. For instance, the user input is the listing agent's 124 press of the control 1052. Once the control 1052 is turned on, at 1706, the specialized remote computer software application 204 retrieves the audio of the listing agent 124 that is captured by the interface device 208. The audio input is not sent to any other devices for playback. At 1708, the specialized remote computer software application 204 transcribes the audio input into text indicating the request for real-time virtual showing feedback. At 1710, the specialized remote computer software application 204 sends the request to the specialized sever software application 304.

Alternatively, at 1712, the specialized remote computer software application 204 sends the audio input to the specialized sever software application 304. At 1714, the specialized sever software application 304 transcribes the audio input into text indicating the request for real-time virtual showing feedback. In either case, the specialized sever software application 304 is said to receive the virtual showing real-time feedback request from the listing agent device 134. It should be noted that the audio for real-time virtual showing feedback from the listing agent device 134 is not transmitted to any of the devices 130-138.

As 1716, the specialized sever software application 304 determines the target device to send the request to based on the real-time feedback pair. At 1718, the specialized sever software application 304 sends the request to the target device, i.e., the showing agent device 130 in the illustrative embodiment. At 1720, the specialized remote computer software application 204 running on the showing agent device 130 receives the request. At 1722, the specialized remote computer software application 204 displays the request to the showing agent 120 on the device 130.

In response, the showing agent 120 speaks a response, i.e., her/his real-time feedback. At 1724, the specialized remote computer software application 204 retrieves the audio of the showing agent 120 captured by the interface 208 of the device 130. The audio input is not sent to any other device for playback. At 1726, the specialized remote computer software application 204 transcribes the audio input into text indicating the real-time feedback response to the listing agent 124. At 1728, the specialized remote computer software application 204 sends the response to the specialized sever software application 304.

Alternatively, at 1730, the specialized remote computer software application 204 sends the audio input to the specialized sever software application 304. At 1732, the specialized sever software application 304 transcribes the audio input into text indicating the response. In either case, the specialized sever software application 304 is said to receive the virtual showing real-time feedback from the showing agent device 130. It should be noted that the audio from the showing agent device 130 is not transmitted to any of the devices 130-138.

At 1734, the specialized sever software application 304 sends the response to the listing agent device 134. At 1736, the specialized remote computer software application 204 running on the listing agent device 134 receives the response. It further indicates the response to the listing agent 124. For instance it displays the response on the display screen 214 of the device 134. At 1738, the specialized sever software application 304 updates the virtual showing appointment with the virtual showing real-time feedback. At 1740, the specialized sever software application 304 stores updated virtual showing appointment into the database 112. The process 1700 provides a confidential data communication channel solely between the devices 130 and 134 during the virtual showing.

Figure 18:
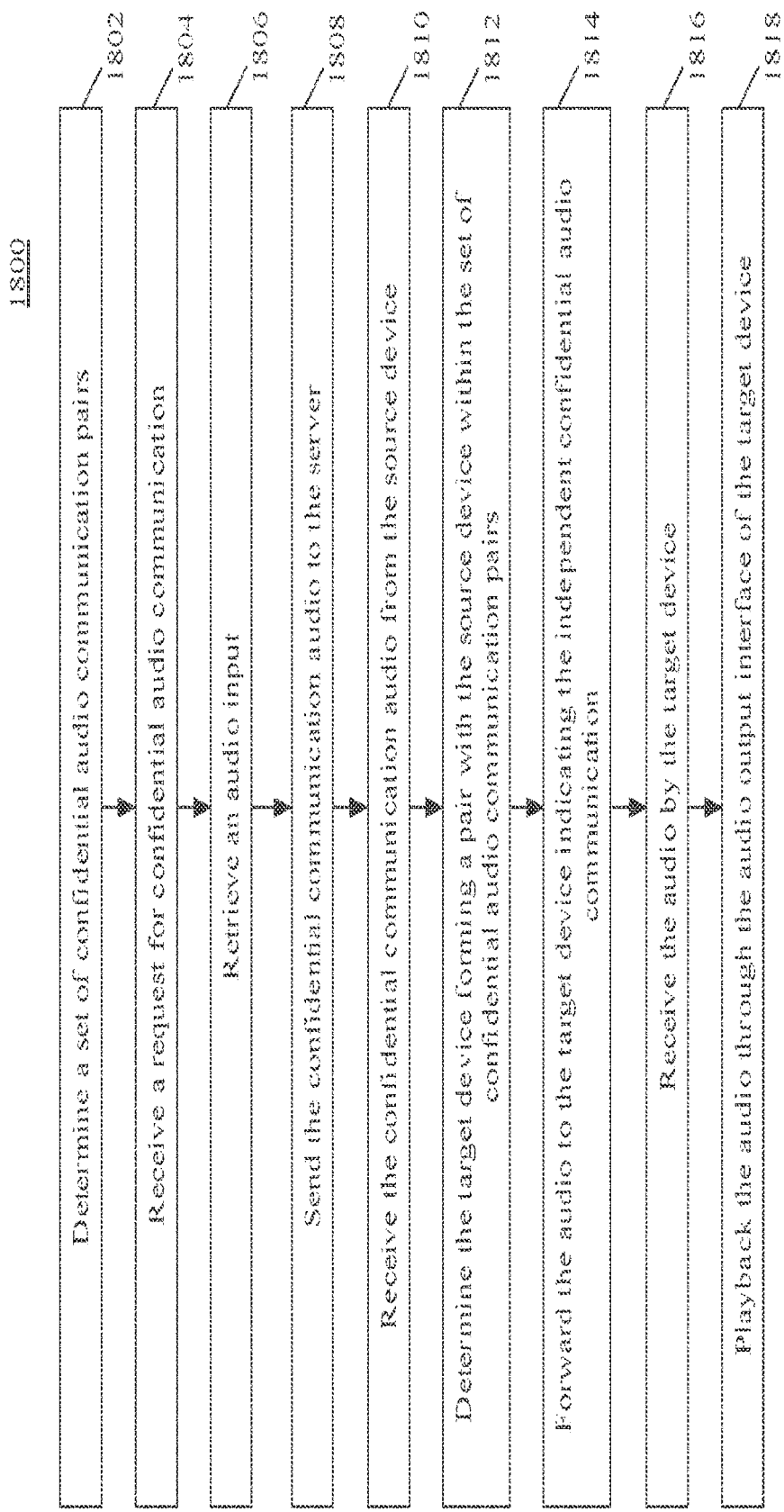
FIG. 18 is a flowchart illustrating a process by which a showing management system manages independent confidential audio communication channels of a virtual showing in accordance with the teachings of this disclosure.

The virtual showing management system further provides separate and confidential audio communication channels with separate subgroups of the participants of the virtual showing. The separate and confidential audio communication is further illustrated by reference to FIG. 18. Turning to FIG. 18, a flowchart illustrating a process by which the specialized sever software application 304 and the specialized remote computer software application 204 manage independent confidential audio communication channels during the virtual showing is shown and generally indicated at 1800. At 1802, the specialized sever software application 304 determines a set (meaning one or more) of independent confidential audio communication pairs. For instance, the showing agent device 130 and the buyer device 132 form a pair while the listing agent device 134 and the seller device 136 form a different and independent pair.

At 1804, the specialized remote computer software application 204 receives a request for confidential audio communication. For instance, the request is generated when the showing agent 120 presses the control 612, the buyer presses the control 820, the listing agent 124 presses the control 1062 or the seller presses the control 1328. At 1806, the specialized remote computer software application 204 retrieves the audio of the user captured by the interface 208 of the corresponding electronic communication device (such as 130, 132, 134 or 136). At 1808, the specialized remote computer software application 204 sends the audio the specialized sever software application 304 and indicates to the application 304 that the audio is for an independent confidential audio communication. At 1810, the specialized sever software application 304 receives the audio and the indication. For instance, the indication is present in a message header.

At 1812, the specialized sever software application 304 determines the target device of the independent confidential audio communication from the set of independent confidential audio communication pairs determined at 1802. At 1814, the specialized sever software application 304 forwards the received audio and the confidential audio communication indication to the target device. For instance, audio received from the listing agent device 134 is only forwarded to the seller device 136, not any other device for playback. At 1816, the specialized remote computer software application 204 running on the target device receives the audio. At 1818, the specialized remote computer software application 204 plays bade the audio via the interface 206 of the target device. When the target participant intends to make a response or initiate an independent confidential audio communication, the elements 1804-1818 are performed to achieve the goal.

During the virtual showing, the buyer 122 may become disengaged. When she/he has a decreased level of interest in the property or the virtual showing, she/he likely engages in other types of activities. For example, she/he swipes the mobile app 204 out of focus or moves her/his vision onto something else. The swipes are tracked by specialized remote computer software application 204, while the buyer's focus change can be determined using video analytic technologies, such as machine deep learning. Such disengagement is important information to the listing agent 124 for marketing the property. Accordingly the listing agent 124 desires to learn the buyer's level of engagement during the virtual showing of the property. Furthermore, the listing agent 124 desires to learn such information in real-time to help pinpoint the problems with the property or the virtual showing of the same.

Figure 19:
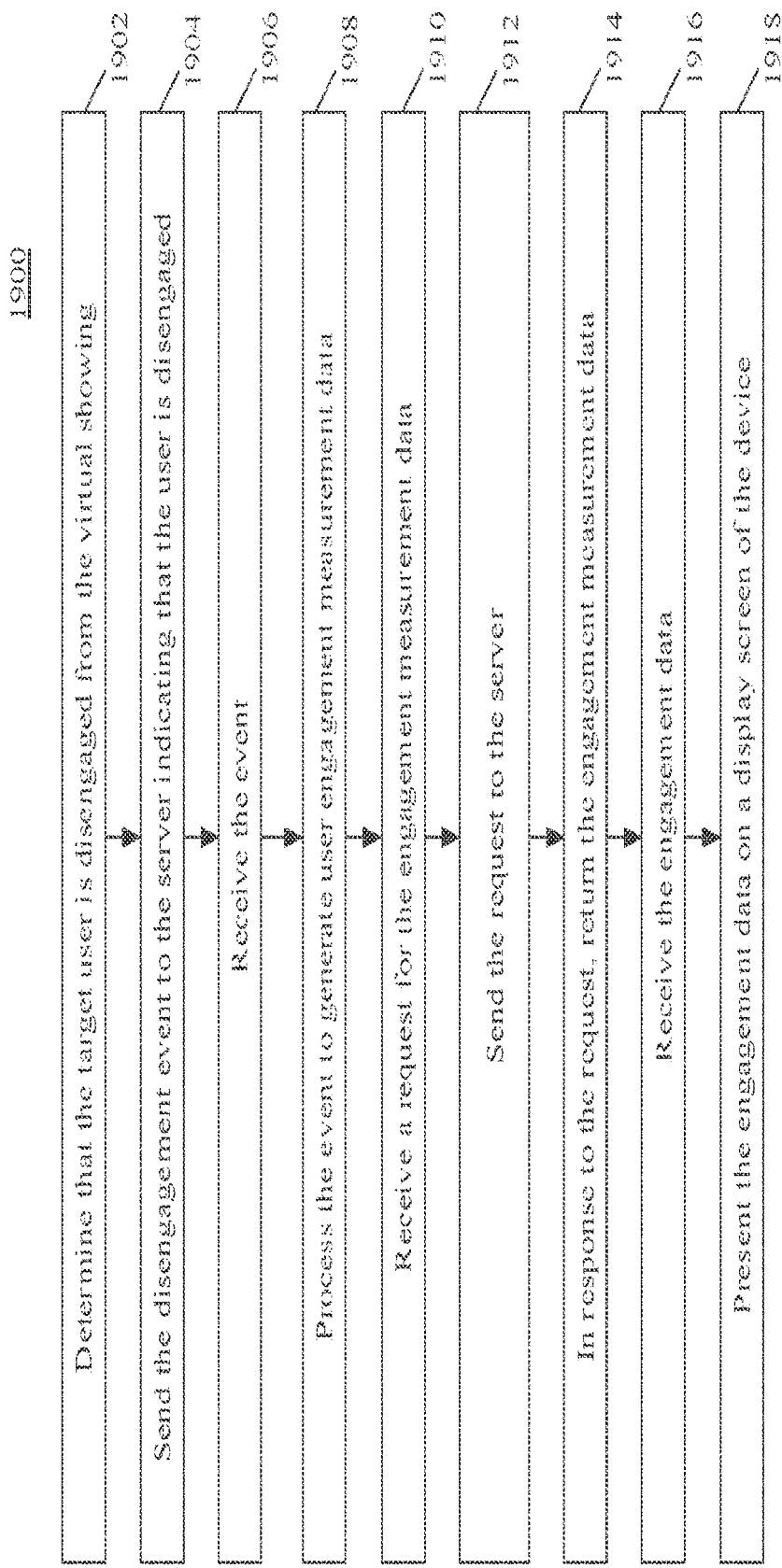
FIG. 19 is a flowchart illustrating a process by which a showing management system manages a participant's engagement of a virtual showing in accordance with the teachings of this disclosure.

The buyer engagement management is further illustrated by reference to FIG. 19. Turning to FIG. 19, a flowchart illustrating a process by which the specialized sever software application 304 and the specialized remote computer software application 204 manage the buyer engagement data is shown and generally indicated at 1900. At 1902, the specialized remote computer software application 204 running on a target user device, such as the buyer device 132, determines that the user is disengaged from the virtual showing. The disengagement is an event with an event type and an event timestamp. At 1904, the specialized remote computer software application 204 sends the event to the specialized sever software application 304. At 1906, the specialized sever software application 304 receives the event. At 1908, the specialized sever software application 304 processes the event to generate target user engagement measurement data. The input to the process may also include previous received events.

At 1910, the specialized sever software application 204 running on an engagement measurement data consuming user device, such as the listing agent device 134, receives a request for the target user's engagement measurement data. For instance, the request is received when the listing agent 124 presses the control 1054. At 1912, the specialized sever software application 204 sends the request to the specialized sever software application 304. At 1914, in response to the request, the specialized sever software application 304 sends the engagement measurement data to the specialized remote computer software application 204 running on the listing agent device 134. At 1916, the specialized remote computer software application 204 receives the engagement measurement data. At 1918, it presents the engagement measurement data on the display screen 214 of the listing agent device 134. For example, the user engagement measurement data is the number of times the buyer 122 has swiped the mobile app 204 out of focus since the beginning of the virtual showing. As another example, the user engagement measurement data is the number of times the buyer 122 has swiped the mobile app 204 out of focus when a particular feature (such as the dining room) is being shown. The user engagement measurement data may also indicate the time when the disengagement occurs.

When a feature of the property is being virtually shown, it is highly desirable that the feature is automatically recognized and indicated on the screens of the participants. For instance, when a bed room or a library of the property is being shown, the virtual showing system automatically tag the video stream from the presenter device 138 with a feature designation, such as the feature designation 670, 870 and 1070 in FIGS. 6, 8 and 10 respectively. The auto-tagging process is further illustrated by reference to FIG. 20.

Figure 20:
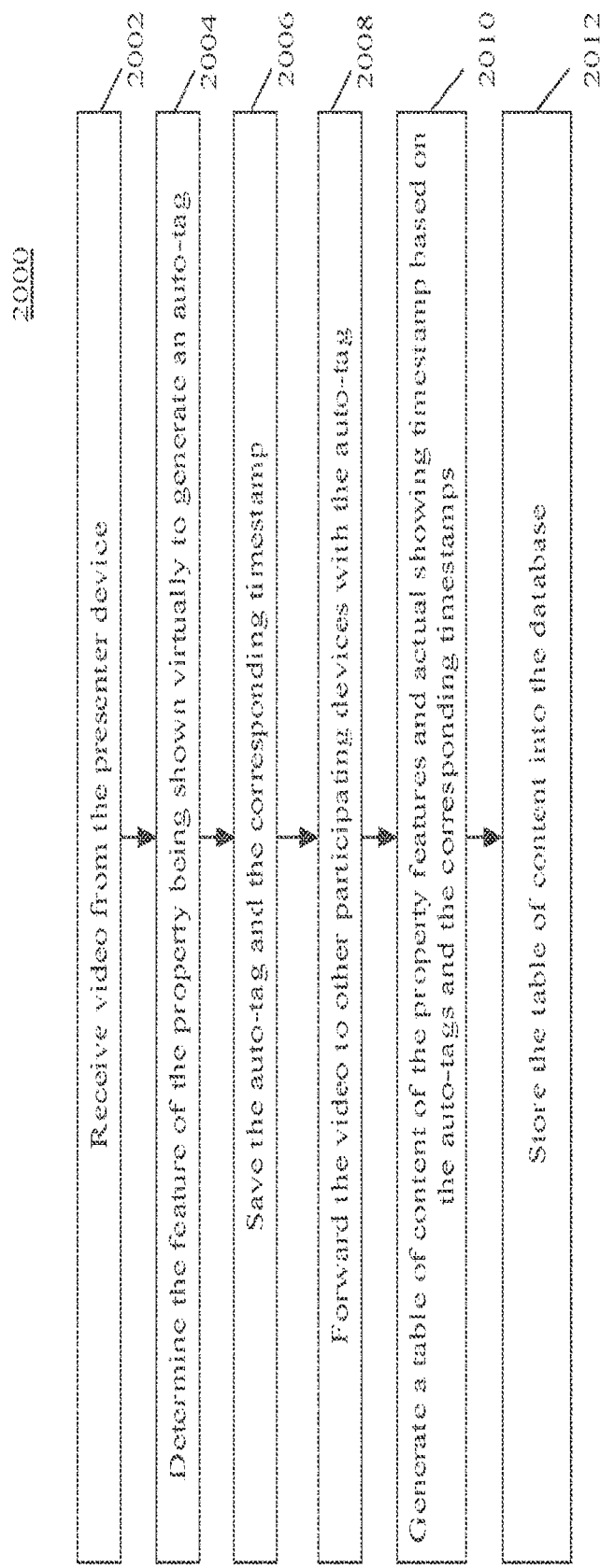
FIG. 20 is a flowchart illustrating a process by which a showing management system auto-tags a property feature during a virtual showing in accordance with the teachings of this disclosure.

Referring to FIG. 20, a flowchart illustrating a process by which the specialized sever software application 304 auto-tags property features is shown and generally indicated at 2000. At 2002, the specialized sever software application 304 receives video data from the presenter device 138. At 2004, it determines the feature of the property that is being virtually shown to generate an auto-tag, such as the auto-tags 670, 870 and 1070. In other words the feature is recognized and identified. At 2006, the specialized sever software application 304 saves the auto-tag and the corresponding timestamp when the present feature become being shown. At 2008, the specialized sever software application 304 forwards the video and the auto-tag to the devices 130-136. At 2010, the specialized sever software application 304 adds the newly generated auto-tag and its timestamp into a table of content of the virtual showing. At 2012, the specialized sever software application 304 stores the table of content into the database 112.

Alternatively, the auto-tagging element 2004 is performed by the specialized remote computer software application 204 running on the presenter device 138. The specialized remote computer software application 204 then sends the video data along with the auto-tag to the specialized sever software application 304. Auto-tagging utilizes video image analytical technologies such as deep machine learning technologies.

Obviously, many additional modifications and variations of the present disclosure are possible in light of the above teachings Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A computer-implemented method comprising:
presenting, by one or more computer devices, video of a property that is captured by a first device at the property to each of multiple other devices remote from the property, the multiple other devices including at least a second device, a third device and a fourth device;
determining, by the one or more computer devices, a confidential communication pair including only the second and third devices;
establishing, by the one or more computer devices and during the presenting of the video, multiple communication channels between the multiple other devices, the multiple communication channels including a shared communication channel between all of the multiple other devices in which transmissions for the shared communication channel are routed via a relay server device, and including a confidential communication channel that is between only the second and third devices of the confidential communication pair and is separate from the shared communication channel and in which other transmissions for the confidential communication channel are sent directly between the second and third devices without being routed via the relay server device;

exchanging, by the one or more computer devices and concurrently with the presenting of the video as part of the shared communication channel between the multiple other devices, first data between the multiple other devices, wherein the first data is received from at least one of the multiple other devices and is routed to other of the multiple other devices via the relay server device; and exchanging, by the one or more computer devices and as part of the confidential communication channel that includes only the second and third devices and is separate from the shared communication channel, second data that is directly routed between only the second and third devices without being routed via the relay server device, wherein the exchanging of the second data includes:
  receiving a disengagement event from the second device corresponding to one or more activities of a user of the second device during the presenting of the video;
  analyzing the disengagement event to generate user engagement measurement data; and
  forwarding the user engagement measurement data to the third device.

2. The computer-implemented method of claim 1 wherein the shared communication channel further includes the first device at the property, and wherein the exchanging of the first data further includes sending the first data to the first device.

3. The computer-implemented method of claim 1 wherein the one or more computer devices include the first device.

4. The computer-implemented method of claim 1 wherein the video is presented on the second device as part of an application program, and wherein the disengagement event is based at least in part on the user of the second device performing at least one of interacting with the second device to change a focus on the second device away from the application program or moving vision of the user away from the application program.

5. The computer-implemented method of claim 1 wherein the exchanging of the second data further includes determining a quantity of multiple disengagement events from the second device during the presenting of the video, and including the determined quantity as part of the user engagement measurement data.

6. The computer-implemented method of claim 1 wherein the analyzing of the disengagement event includes determining a timestamp for the disengagement event during the video, and including the determined timestamp as part of the user engagement measurement data.

7. A system comprising:
one or more processing units; and
one or more memories storing a server computer software application that, when executed by the one or more processing units, adapt the system to perform operations including at least:
  presenting video of a property that is captured by a first device at the property to each of multiple other devices remote from the property, the multiple other devices including at least a second device, a third device and a fourth device;
  determining a first confidential communication pair including only the second and third devices, and determining a second confidential communication pair including only the fourth device and one other device that is not the second or third devices;
  establishing, during the presenting of the video, multiple communication channels between the multiple other devices, the multiple communication channels including a shared communication channel between all of the multiple other devices in which transmissions for the shared communication channel are routed via a relay server device, and including a first confidential communication channel that is between only the second and third devices of the first confidential communication pair and is separate from the shared communication channel and in which first transmissions for the first confidential communication channel are sent directly between the second and third devices without being routed via the relay server device, and including a second confidential communication channel that is between only the fourth device and the one other device of the second confidential communication pair and is separate from the shared communication channel and from the first confidential communication channel and in which second transmissions for the second confidential communication channel are sent directly between the fourth device and the one other device without being routed via the relay server device;
  exchanging, concurrently with the presenting of the video and as part of the shared communication channel between the multiple other devices, first data between the multiple other devices, wherein the first data is received from at least one of the multiple other devices and is routed to other of the multiple other devices via the relay server device;
  exchanging, concurrently with the presenting of the video and as part of the first confidential communication channel that is between only the second and third devices and is separate from the shared communication channel, second data between only the second and third devices, wherein the second data is received from one of the second and third devices and is directly routed to an other of the second and third devices without being routed via the relay server device, and wherein the exchanging of the second data between only the second and third devices includes limiting transmission of the second data to not be accessible to the fourth device; and
  exchanging, concurrently with the presenting of the video and as part of the second confidential communication channel that is between only the fourth device and one other device and is separate from the shared communication channel and from the first confidential communication channel, third data between only the fourth device and one other device, wherein the third data is received from the fourth device and is directly routed to the one other device without being routed via the relay server device, and wherein the exchanging of the third data between only the fourth device and the one other device includes limiting transmission of the third data to not be accessible to the second and third devices.

8. The system of claim 7 wherein the shared communication channel further includes the first device at the property, wherein the exchanging of the first data further includes sending the first data to the first device, and wherein the one other device is the first device.

9. The system of claim 7 wherein the multiple other devices further include a fifth device remote from the property, and wherein the one other device is the fifth device.

10. The system of claim 7 wherein the exchanging of the second data as part of the first confidential communication channel includes:
receiving, from the second device, a feedback request during the presenting of the video;
forwarding the feedback request to the third device over the first confidential communication channel;
receiving, in response to the feedback request, feedback during the presenting of the video from the third device; and
forwarding the feedback to the second device over the first confidential communication channel; and
wherein the system is further adapted to update stored information associated with at least one of the video or the property to include the feedback.

11. The system of claim 10 wherein the system is further adapted to:
transcribe, before forwarding of the feedback request, the feedback request from audio captured by the second device to a first group of text, wherein the forwarded feedback request is the transcribed first group of text; and
transcribe, before forwarding of the feedback, the feedback from audio captured by the third device to a second group of text, wherein the forwarded feedback is the transcribed second group of text.

12. The system of claim 7 wherein the exchanging of the second data includes receiving confidential communication audio from the second device, and forwarding the confidential communication audio over the first confidential communication channel to only the third device.

13. The system of claim 7 wherein the system is further adapted to:
receive a disengagement event from the second device corresponding to one or more activities of a user of the second device during the presenting of the video;
analyze the disengagement event to generate user engagement measurement data; and
forward the user engagement measurement data to at least one of the fourth device or the one other device.

14. The system of claim 7 wherein the system is further adapted to:
determine an auto-tag of a feature of the property that is visible in the video; and
store the auto-tag and a corresponding timestamp, and wherein the presenting of the video to the multiple other devices over the shared communication channel includes forwarding the auto-tag to the multiple other devices.

15. The system of claim 7 wherein the one or more processing units and the one or more memories are part of the first device, and wherein the first device is configured to execute the server computer software application.

16. A system comprising:
one or more processing units; and
one or more memories storing a server computer software application that, when executed by the one or more processing units, adapt the system to perform operations including at least:
presenting video of a property that is captured by a first device at the property to each of multiple other devices remote from the property, the multiple other devices including at least a second device, a third device and a fourth device;
determining a confidential communication pair including only the second and third devices;
establishing, during the presenting of the video, multiple communication channels between the multiple other devices, the multiple communication channels including a shared communication channel between all of the multiple other devices in which transmissions for the shared communication channel are routed via a relay server device, and including a confidential communication channel that is between only the second and third devices of the confidential communication pair and is separate from the shared communication channel and in which other transmissions for the confidential communication channel are sent directly between the second and third devices without being routed via the relay server device;
exchanging, concurrently with the presenting of the video and as part of the shared communication channel between the multiple other devices, first data between the multiple other devices, wherein the first data is received from at least one of the multiple other devices and is routed to other of the multiple other devices via the relay server device; and
exchanging, concurrently with the presenting of the video and as part of the confidential communication channel that is between only the second and third devices and is separate from the shared communication channel, second data that is directly routed between only the second and third devices without being routed via the relay server device, wherein the exchanging of the second data includes:
receiving, from the second device, a real-time feedback request during the presenting of the video;
forwarding the real-time feedback request to the third device over the confidential communication channel;
receiving, from the third device and in response to the real-time feedback request, real-time feedback from the third device during the presenting of the video; and
forwarding the real-time feedback to the second device over the confidential communication channel.

17. The system of claim 16 wherein the shared communication channel further includes the first device at the property, and wherein the exchanging of the first data further includes sending the first data to the first device.

18. The system of claim 16 wherein the first device at the property is a presenter device.

19. The system of claim 16 wherein the system is further adapted to:
transcribe, before forwarding of the real-time feedback request, the real-time feedback request from audio captured by the second device to a first group of text, wherein the forwarded real-time feedback request is the transcribed first group of text; and
transcribe, before forwarding of the real-time feedback, the real-time feedback from audio captured by the third device to a second group of text, wherein the forwarded real-time feedback is the transcribed second group of text.

20. The system of claim 16 wherein the exchanging of the second data includes receiving confidential communication audio from the second device, and forwarding the confidential communication audio over the confidential communication channel to only the third device.

* * * * *